United States Patent
Fujiwara et al.

(10) Patent No.: US 11,466,885 B2
(45) Date of Patent: Oct. 11, 2022

(54) AIR-CONDITIONING CONTROL DEVICE, AIR-CONDITIONING SYSTEM, AND AIR-CONDITIONING CONTROL METHOD

(71) Applicants: KABUSHIKI KAISHA TOSHIBA, Minato-ku (JP); Toshiba Carrier Corporation, Kawasaki (JP)

(72) Inventors: Kenichi Fujiwara, Kawasaki (JP); Satoko Sugisaki, Fuji (JP)

(73) Assignees: KABUSHIKI KAISHA TOSHIBA, Minato-ku (JP); Toshiba Carrier Corporation, Kawasaki (JP)

( * ) Notice: Subject to any disclaimer, the term of this patent is extended or adjusted under 35 U.S.C. 154(b) by 71 days.

(21) Appl. No.: 16/816,368

(22) Filed: Mar. 12, 2020

(65) Prior Publication Data

US 2020/0208863 A1   Jul. 2, 2020

Related U.S. Application Data

(63) Continuation of application No. PCT/JP2019/007707, filed on Feb. 27, 2019.

(30) Foreign Application Priority Data

Mar. 14, 2018   (JP) ............................. JP2018-046903

(51) Int. Cl.
*F24F 11/46* (2018.01)
*F24F 11/64* (2018.01)
(Continued)

(52) U.S. Cl.
CPC .............. *F24F 11/46* (2018.01); *F24F 11/64* (2018.01); *F24F 11/65* (2018.01); *G05B 13/048* (2013.01)

(58) Field of Classification Search
CPC . F24F 11/46; F24F 11/64; F24F 11/65; G05B 13/048
See application file for complete search history.

(56) References Cited

U.S. PATENT DOCUMENTS

2013/0282181 A1* 10/2013 Lu ............................ F24F 11/30
                                                                     700/275
2014/0088782 A1*  3/2014 Ogino ...................... G05B 15/02
                                                                     700/295
(Continued)

FOREIGN PATENT DOCUMENTS

CN   104110788 A   * 10/2014
CN   106016636 A    10/2016
(Continued)

OTHER PUBLICATIONS

International Search Report dated Apr. 9, 2019 in PCT/JP2019/007707 filed on Feb. 27, 2019, 1 page.
(Continued)

*Primary Examiner* — Thomas C Lee
*Assistant Examiner* — Michael Tang
(74) *Attorney, Agent, or Firm* — Oblon, McClelland, Maier & Neustadt, L.L.P.

(57) ABSTRACT

According to one embodiment, an air-conditioning control device includes model storage and a processor. The model storage is configured to store a discomfort probability model which estimates a value of discomfort of an occupant by a pair of time elapsed after an energy-saving operation of an air conditioner is turned on and before the energy-saving operation is turned off by the occupant, and an air-conditioning state at the time when the energy-saving operation is turned off. The processor is configured to acquire a current air-conditioning state during the energy-saving operation of the air conditioner, and turn off the energy-saving operation,
(Continued)

based on occupant's discomfort estimated from the discomfort probability model.

8 Claims, 15 Drawing Sheets

(51) Int. Cl.
 *F24F 11/65* (2018.01)
 *G05B 13/04* (2006.01)

(56) References Cited

U.S. PATENT DOCUMENTS

| | | | |
|---|---|---|---|
| 2014/0207256 A1* | 7/2014 | Kouda | G05B 13/02 700/22 |
| 2016/0209064 A1* | 7/2016 | Hrejsa | F24F 11/30 |
| 2017/0187815 A1* | 6/2017 | Vainas | H04W 4/023 |
| 2017/0254554 A1 | 9/2017 | Takeuchi et al. | |
| 2018/0202677 A1* | 7/2018 | Endel | F24F 11/30 |

FOREIGN PATENT DOCUMENTS

| | | |
|---|---|---|
| CN | 106196474 A | 12/2016 |
| CN | 106979580 A | 7/2017 |
| CN | 107576022 A | 1/2018 |
| EP | 2 233 849 A1 | 9/2010 |
| EP | 2 725 817 A1 | 4/2014 |
| EP | 2 985 540 A1 | 2/2016 |
| EP | 3 070 411 A1 | 9/2016 |
| JP | 2001-174022 A | 6/2001 |
| JP | 2002-46462 A | 2/2002 |
| JP | 2010-175229 A | 8/2010 |
| JP | 2011-69601 A | 4/2011 |
| JP | 2011-196568 A | 10/2011 |
| JP | 2011196568 A * | 10/2011 ............. F24F 11/30 |
| JP | 2011-247488 A | 12/2011 |
| JP | 2012-145246 A | 8/2012 |
| JP | 2012-225609 A | 11/2012 |
| JP | 2012-247100 A | 12/2012 |
| JP | 2013-249991 A | 12/2013 |
| JP | 2014-194290 A | 10/2014 |
| JP | 2016-57038 A | 4/2016 |
| JP | 2016-176611 A | 10/2016 |
| JP | 2017-161216 A | 9/2017 |
| JP | 6285815 B2 | 2/2018 |
| JP | 2019-049404 A | 3/2019 |
| WO | WO 2012/165359 A1 | 12/2012 |
| WO | WO 2012/176690 A1 | 12/2012 |
| WO | WO 2014/087650 A1 | 6/2014 |

OTHER PUBLICATIONS

Fujiwara et al., "How office workers use air conditioners and energy saving strategies", The 60th Japan Joint Automatic Control Conference (Session ID SaC2-2), 2017, 16 pages, (with English Machine Translation).

* cited by examiner

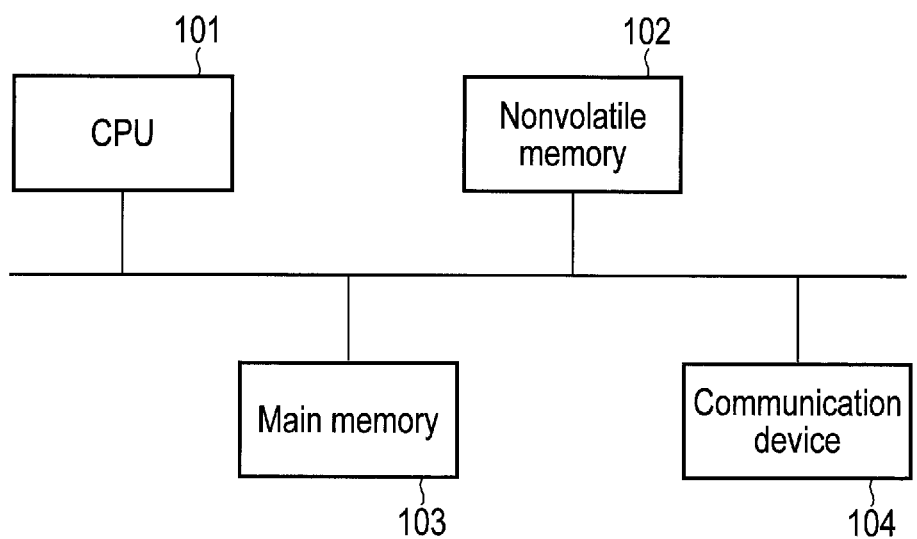
F I G. 2

| Time | First set temperature | First room temperature | First energy-saving operation flag | Second set temperature | Second room temperature | Second energy-saving operation flag | Average room temperature | |
|---|---|---|---|---|---|---|---|---|
| 10:15 | 24 | 24.5 | 0 | 24 | 24.5 | 0 | 24.50 | ~121 |
| 10:20 | 24 | 24.0 | 0 | 24 | 24.5 | 0 | 24.25 | |
| 10:25 | 24 | 24.0 | 0 | 24 | 24.5 | 0 | 24.25 | |
| 10:30 | ☐27 | 24.0 | 1 | 24 | 24.5 | 0 | 24.25 | ~122 |
| 10:35 | 27 | 24.5 | 1 | 24 | 24.5 | 0 | 24.50 | |
| 10:40 | 27 | 24.5 | 1 | 24 | 24.5 | 0 | 24.50 | |
| 10:45 | 27 | 25.0 | 1 | 24 | 24.5 | 0 | 24.75 | |
| 10:50 | 27 | 25.0 | 1 | 24 | 25.0 | 0 | 25.00 | |
| 10:55 | 27 | 25.5 | 1 | 24 | 25.0 | 0 | 25.25 | |
| 11:00 | 27 | 25.5 | 1 | 24 | 25.0 | 0 | 25.25 | |
| 11:05 | 27 | 26.0 | 1 | 24 | 25.0 | 0 | 25.50 | |
| 11:10 | 27 | 26.0 | 1 | 24 | 25.5 | 0 | 25.75 | |
| 11:15 | 27 | 26.0 | 1 | 24 | 25.5 | 0 | 25.75 | |
| 11:20 | 27 | 26.5 | 1 | 24 | 25.5 | 0 | 26.00 | |
| 11:25 | ✕26 | 26.5 | 0 | 24 | 25.5 | 0 | 26.00 | ~123 |
| 11:30 | 26 | 26.5 | 0 | 24 | 25.5 | 0 | 26.00 | |
| 11:35 | 26 | 26.0 | 0 | 24 | 25.0 | 0 | 25.50 | |
| 11:40 | 26 | 25.5 | 0 | 24 | 25.0 | 0 | 25.25 | |
| ... | ... | ... | ... | ... | ... | ... | ... | |
| 13:30 | 26 | 24.5 | 0 | 24 | 24.5 | 0 | 24.50 | |
| 13:35 | 26 | 24.5 | 0 | ☐27 | 24.5 | 1 | 24.50 | ~124 |
| 13:40 | 26 | 24.5 | 0 | 27 | 25.0 | 1 | 24.75 | |
| 13:45 | 26 | 24.5 | 0 | 27 | 25.5 | 1 | 25.00 | |
| 13:50 | 26 | 25.0 | 0 | 27 | 25.5 | 1 | 25.25 | |
| 13:55 | 26 | 25.0 | 0 | 27 | 26.0 | 1 | 25.50 | |
| 14:00 | 26 | 25.5 | 0 | 27 | 26.0 | 1 | 25.75 | |
| 14:05 | 26 | 25.5 | 0 | 27 | 26.5 | 1 | 26.00 | |
| 14:10 | 26 | 26.0 | 0 | 27 | 26.5 | 1 | 26.25 | |
| 14:15 | 26 | 26.0 | 0 | 27 | 27.0 | 1 | 26.50 | |
| 14:20 | 26 | 27.0 | 0 | ✕24 | 27.0 | 0 | 27.00 | ~125 |
| 14:25 | 26 | 26.0 | 0 | 24 | 26.0 | 0 | 26.00 | |
| 14:30 | 26 | 26.5 | 0 | 24 | 25.0 | 0 | 25.75 | |
| ... | ... | ... | ... | ... | ... | ... | ... | |

F I G. 4

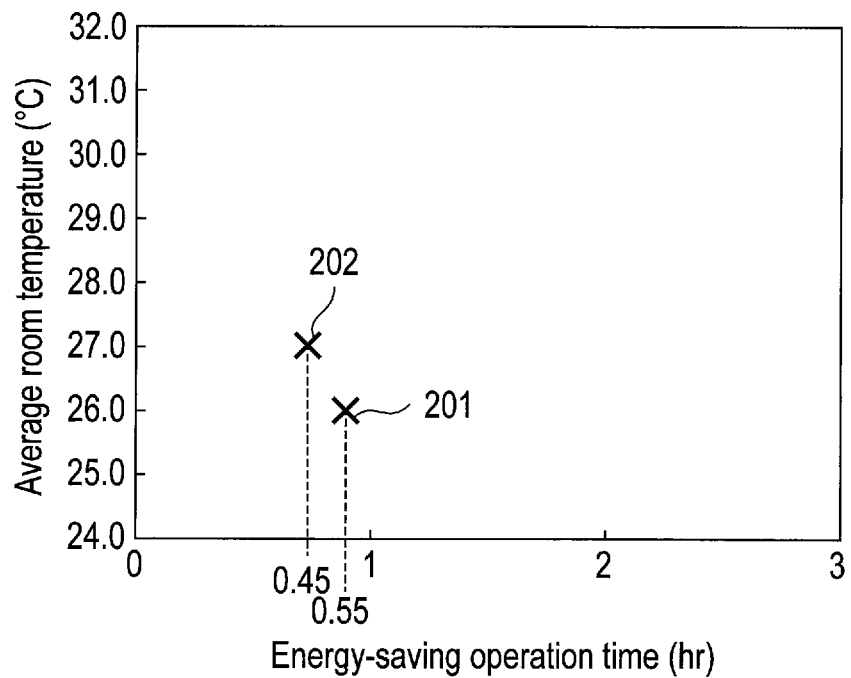
F I G. 7
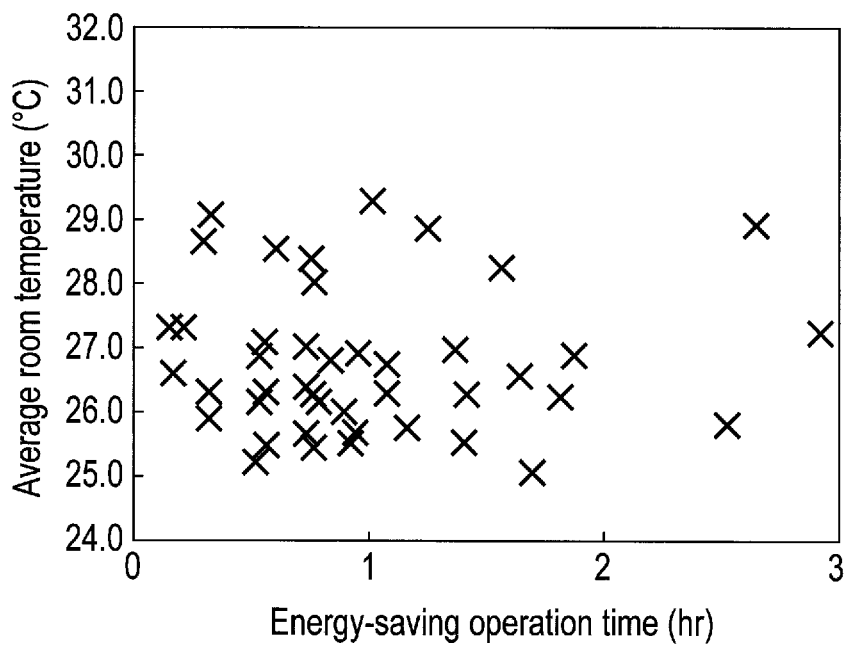
F I G. 8

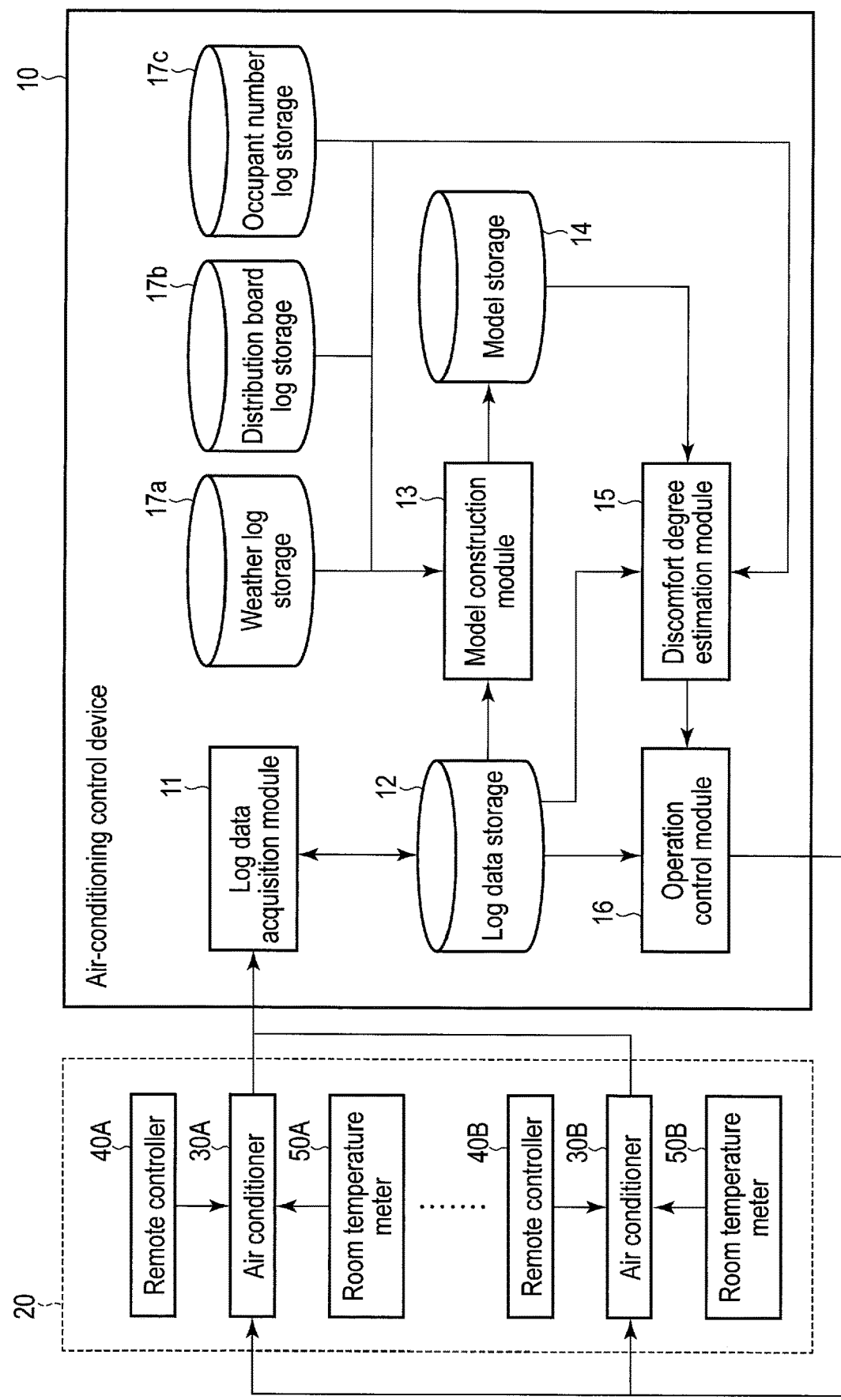
F I G. 12

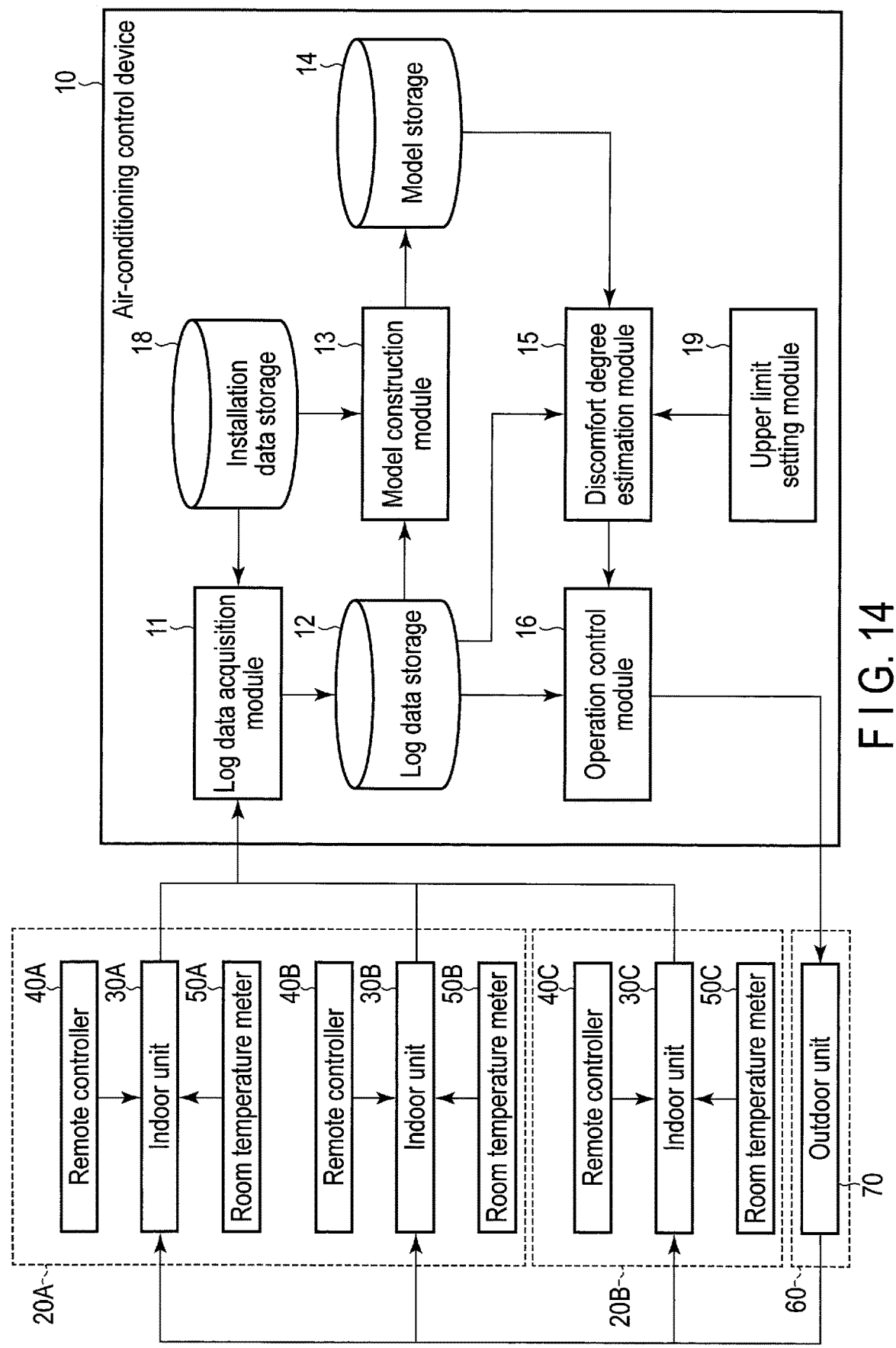
F I G. 14

| Room ID | Indoor unit ID | |
|---------|----------------|---|
| 20A | 30A | ~181 |
| 20A | 30A | ~182 |
| 20B | 30B | ~183 |

18

F I G. 15

| Time | First set temperature | First room temperature | First energy-saving operation flag | First required amount | Second set temperature | Second room temperature | Second energy-saving operation flag | Second required amount | Third set temperature | Third room temperature | Third energy-saving operation flag | Third required amount |
|---|---|---|---|---|---|---|---|---|---|---|---|---|
| 10:15 | 24 | 24.5 | 0 | Required amount 11 | 24 | 24.5 | 0 | Required amount 21 | 24 | 24.0 | 0 | Required amount 31 |
| 10:20 | 24 | 24.0 | 0 | Required amount 12 | 24 | 24.5 | 0 | Required amount 22 | 24 | 24.0 | 0 | Required amount 32 |
| ... | ... | ... | ... | ... | ... | ... | ... | ... | ... | ... | ... | ... |

F I G. 16

AIR-CONDITIONING CONTROL DEVICE, AIR-CONDITIONING SYSTEM, AND AIR-CONDITIONING CONTROL METHOD

CROSS-REFERENCE TO RELATED APPLICATIONS

This application is a Continuation Application of PCT Application No. PCT/JP2019/007707, filed Feb. 27, 2019 and based upon and claiming the benefit of priority from Japanese Patent Application No. 2018-046903, filed Mar. 14, 2018, the entire contents of all of which are incorporated herein by reference.

FIELD

Embodiments described herein relate generally to an air-conditioning control device, an air-conditioning system, and an air-conditioning control method.

BACKGROUND

In general, an air conditioner is installed in a room of an office and the like, and the air conditioner is required to be operated so as to save energy (hereinafter referred to as an energy-saving operation of the air conditioner).

The energy saving operation of the air conditioner is executed by, for example, setting an upper limit for power consumption (save operation), relaxing the set temperature or air volume of the air conditioner, or the like. In addition, when a plurality of air conditioners are installed, energy saving can also be implemented by shifting the output timing of the plurality of air conditioners (peak shift) or the like.

From the viewpoint of energy saving, it is desirable that the energy saving operation of the air conditioner is continued for a long time as long as the comfort of the room where the air conditioner is installed is maintained.

In the energy-saving operation of the air conditioner, however, the indoor comfort gradually decreases since the air conditioner is operated with less power than normally required.

When the indoor comfort gradually decreases and a person in the room (hereinafter referred to as occupant) feels uncomfortable, the occupant can turn off (stop) the energy-saving operation of the air conditioner by operating, for example, a remote controller, but executing an operation for turning off the energy-saving operation is complicated.

For this reason, it can be considered that the energy-saving operation is automatically turned off until the occupant feels uncomfortable after the start of the energy-saving operation of the air conditioner.

However, since the time elapsed before the occupant feels uncomfortable varies, for example, from approximately 10 minutes to several hours depending on the environment where the air conditioner is installed, grasping the time in advance is difficult.

BRIEF DESCRIPTION OF THE DRAWINGS

FIG. 2 is a diagram showing an example of a hardware configuration of the air-conditioning control device.

FIG. 4 is a table showing an example of a data structure of log data.

FIG. 7 is a graph showing a relationship between the energy-saving operation time and an average room temperature as visualized as a plane scatter diagram.

FIG. 8 is a graph showing a relationship between the energy-saving operation time obtained for each energy-saving operation and the average room temperature as visualized as a plane scatter diagram.

FIG. 12 is a diagram illustrating an example of a configuration of an air-conditioning control device 10 when data other than room temperature is used.

FIG. 14 is a diagram showing an example of a configuration of an air-conditioning system containing an air-conditioning control device according to a second embodiment.

FIG. 15 is a table showing an example of a data structure of installation data.

FIG. 16 is a table showing an example of a data structure of log data.

DETAILED DESCRIPTION

In general, according to one embodiment, an air-conditioning control device includes model storage and a processor. The model storage is configured to store a discomfort probability model which estimates a value of discomfort of an occupant by a pair of time elapsed after an energy-saving operation of an air conditioner installed in a room is turned on and before the energy-saving operation is turned off by the occupant, and an air-conditioning state of the room at the time when the energy-saving operation is turned off. The processor is configured to acquire a current air-conditioning state of the room during the energy-saving operation of the air conditioner, and turn off the energy-saving operation, based on occupant's discomfort estimated by applying the discomfort probability model to the pair of the time elapsed after the energy-saving operation is turned on and before a present time and the acquired air-conditioning state.

Various embodiments will be described hereinafter with reference to the accompanying drawings.

First Embodiment

Figure 1:
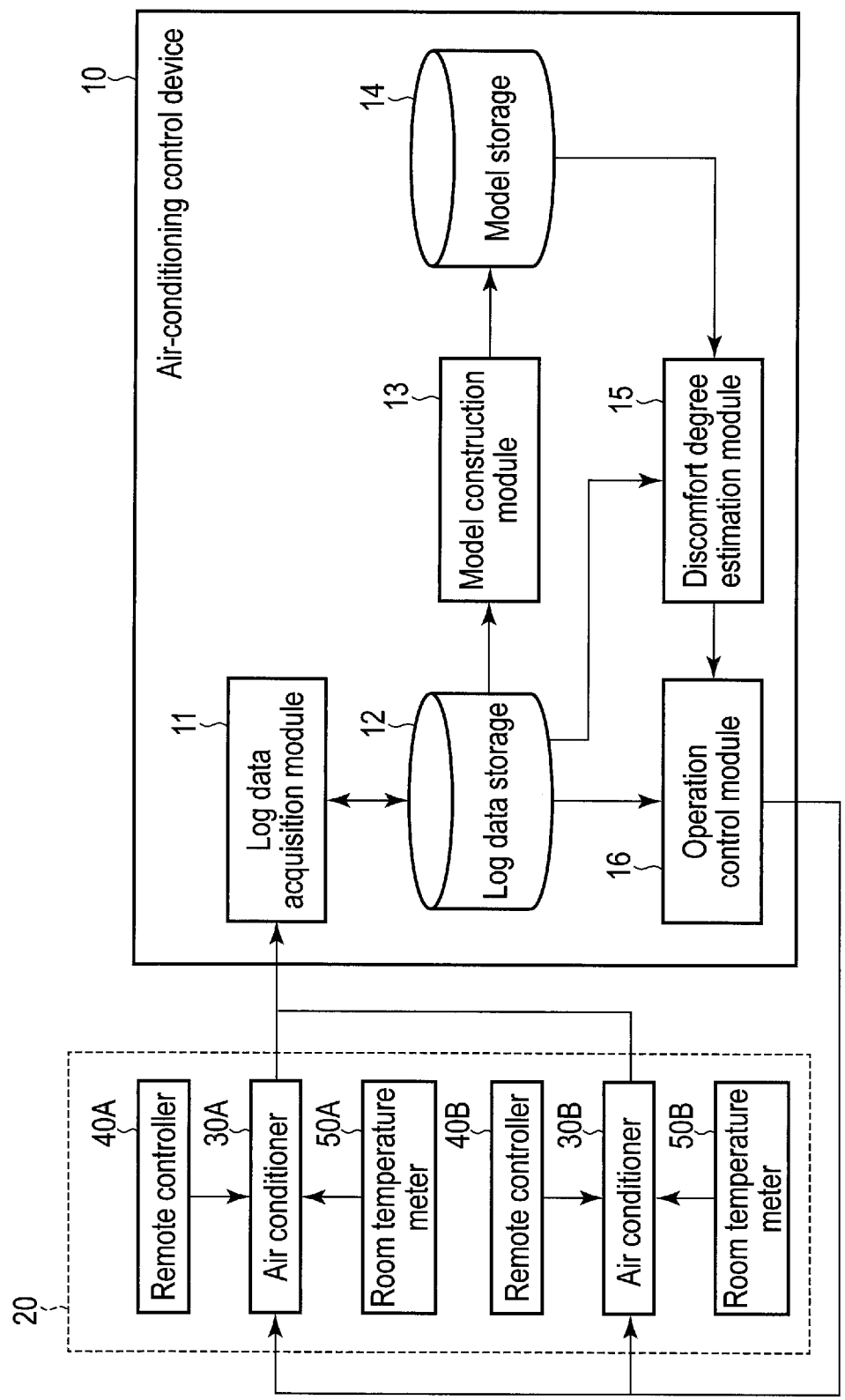
FIG. 1 is a diagram showing an example of a configuration of an air-conditioning system containing an air-conditioning control device according to one of embodiments.

FIG. 1 shows an example of a configuration of an air-conditioning system including an air-conditioning control device according to a first embodiment. As shown in FIG. 1, the air-conditioning system includes an air-conditioning control device 10 and an air conditioner connected to the air-conditioning control device 10 via a transmission path.

In the present embodiment, the air conditioner is installed in, for example, a room (space) such as a room in a building and includes an indoor unit which executes air conditioning in the room. In the present embodiment, as shown in FIG. 1, it will be described that the air-conditioning system includes air conditioners 30A and 30B installed in a room 20, but one air conditioner or three or more air conditioners may be provided in the air-conditioning system.

The room 20 may be the entire facility such as a house or a building, or may be an area in the facility which is a space distinguished by a floor, an inner wall and the like.

For example, the air conditioner 30A executes air conditioning in the room 20 in accordance with set values of the air-conditioning setting input via a remote controller 40A by a person in the room 20 (hereinafter referred to as an occupant). A room temperature meter 50A for measuring a temperature (room temperature) of the room 20 is connected to the air conditioner 30A, and the air conditioner 30A executes air conditioning based on the room temperature measured by the room temperature meter 50A.

Similarly, for example, the air conditioner 30B executes air conditioning of the room 20 in accordance with the set values of the air-conditioning setting input via the remote controller 40B by the occupant. A room temperature meter 50B is connected to the air conditioner 30B, and the air conditioner 30B executes air conditioning based on the room temperature measured by the room temperature meter 50B.

The above-described room temperature meters 50A and 50B may be incorporated in the air conditioners 30A and 30B, respectively, or may be arranged at different positions in the room 20. Furthermore, the room temperature meters 50A and 50B may be the same room temperature meter.

The air-conditioning control device 10 is a device for controlling the operations of the air conditioners 30A and 30B (i.e., controlling the air conditioning of the room 20), and is provided in, for example, a building management room or the like. The air-conditioning control device 10 may be a device such as a Building Energy Management System (BEMS) that is introduced for the purpose of, for example, grasping the air-conditioning state of the room 20 or changing the settings of the air conditioners 30A and 30B by a building manager or may be the other device used in the air-conditioning system.

As shown in FIG. 1, the air-conditioning control device 10 includes a log data acquisition module 11, a log data storage 12, a model construction module 13, a model storage 14, a discomfort degree estimation module 15, and an operation control module 16.

The log data acquisition module 11 acquires log data including the operation conditions of the air conditioners 30A and 30B and the history of the air-conditioning state of the room 20 from each of the air conditioners 30A and 30B. The log data is acquired at predetermined intervals and stored in the log data storage 12. In other words, the log data storage 12 stores log data including previous operation conditions of the air conditioners 30A and 30B and previous air-conditioning state of the room 20.

It is assumed that each of the air conditioners 30A and 30B is capable of energy-saving operation in the present embodiment. The energy-saving operation in the present embodiment is an operation of an air conditioner that implements energy saving (i.e., the air-conditioning system operates with less energy), and includes, for example, the operation of the air conditioner in a state where the air-conditioning setting is relaxed. In the present embodiment, "the air-conditioning setting is relaxed" indicates that the set temperature of the air conditioner is raised when the operation mode of the air conditioner is the cooling mode, and that the set temperature of the air conditioner is lowered when the operation mode of the air-conditioning conditioner is the heating mode. It should be noted that "the air-conditioning setting is relaxed" may indicate, for example, reducing the air volume output from the air conditioner. In the present embodiment, the operation other than the energy-saving operation is referred to as a normal operation for convenience.

The energy-saving operation of each of the air conditioners 30A and 30B may be turned on in accordance with, for example, an operation on the remote controllers 40A and 40B by the occupant or may be turned on under predetermined conditions or the like. The conditions for turning on the energy-saving operation include, for example, conditions that a predetermined time has reached and that the room 20 has reached a predetermined temperature. In addition, for example, when the operation mode of each of the air conditioners 30A and 30B is the cooling mode, the energy-saving operation may be turned on when the set temperature of the air conditioners 30A and 30B is in a time zone that it tends to be raised by the occupant. Similarly, when the operation mode of each of the air conditioners 30A and 30B is the heating mode, the energy-saving operation may be turned on in a time zone when the set temperature of the air conditioners 30A and 30B tends to be lowered by the occupant. The time zone in which the set temperature tends to be raised and the time zone in which the set temperature tends to be lowered may be specified from, for example, log data stored in the log data storage 12 or the other data.

In the energy-saving operation described above, since the air conditioner is operated with less energy (electric power) than normally required, the indoor comfort gradually decreases when the energy-saving operation is continued and, consequently, the occupant feels uncomfortable at some future time.

The model construction module 13 constructs a discomfort probability model based on the log data stored in the log data storage 12. The discomfort probability model is a model used to estimate the degree of discomfort of the occupant in the room 20 (the degree at which the occupant feels uncomfortable in the room 20) based on the time elapsed after the start of the above energy-saving operation and the air-conditioning state of the room 20. The discomfort probability model constructed by the model construction module 13 is stored in the model storage 14. Details of the discomfort probability model will be described later.

The discomfort degree estimation module 15 estimates (evaluates) the discomfort degree of the occupant with the discomfort probability model stored in the model storage 14 during the above energy-saving operation of the air conditioners 30A and 30B.

The operation control module 16 turns off the energy-saving operation of the air conditioners 30A and 30B based on the discomfort degree estimated by the discomfort degree estimation module 15. In this case, the operation control module 16 changes the direction so as to increase the air-conditioning settings (for example, set temperature) of the air conditioners 30A and 30B.

In the present embodiment, "increasing the air-conditioning settings" is the opposite of "relaxing the air-conditioning settings" described above, and implies, for example, lowering the set temperature when the operation mode of the air conditioner is the cooling mode, and raising the set temperature of the air conditioner when the operation mode of the air conditioner is the heating mode.

A building manager can display the log data stored in the log data storage 12 on the display device of the air-conditioning control device 10 by operating the air-conditioning control device 10. In addition, the building manager can also change the set values of the air-conditioning settings of the air conditioners 30A and 30B or turn on the energy-saving operation by operating the air-conditioning control device 10 in the same manner as the above remote controllers 40A and 40B.

FIG. 2 shows an example of a hardware configuration of the air-conditioning control device 10 according to the present embodiment. As shown in FIG. 2, the air-conditioning control device 10 includes a CPU 101, a nonvolatile memory 102, a main memory 103, a communication device 104, and the like.

The CPU 101 is a hardware processor that controls operations of various components in the air-conditioning control device 10. The CPU 101 executes various programs loaded from the nonvolatile memory 102 that is a storage device to the main memory 103. The program executed by the CPU 101 includes an operating system, an application program (hereinafter referred to as an air-conditioning control program) for controlling the operations of the air conditioners 30A and 30B, and the like. The CPU 101 also executes, for example, a basic input/output system (BIOS), which is a program for hardware control, and the like.

In FIG. 2, the air-conditioning control device 10 is described as a device including the CPU 101, but the air-conditioning control device 10 may include a processor or controller other than the CPU 101, and the like as long as the above-described program can be executed.

In the present embodiment, several parts or all parts of the log data acquisition module 11, the model construction module 13, the discomfort degree estimation module 15, and the operation control module 16 described above and shown in FIG. 1 are implemented by causing the CPU 101 to execute an air-conditioning control program, i.e., software. Several parts or all parts of these modules 11, 13, 15 and 16 may be implemented by hardware such as an integrated circuit (IC) or may be implemented as a combined configuration of software and hardware.

In addition, in the present embodiment, the log data storage 12 and the model storage 14 shown in FIG. 1 are implemented by a storage device such as the nonvolatile memory 102 described above or the like.

The communication device 104 is a device configured to execute, for example, wired or wireless communication with an external device.

In FIG. 2, the air-conditioning control device 10 has been described as a device including the CPU 101, the nonvolatile memory 102, the main memory 103, and the communication device 104 for convenience, but the air-conditioning control device 10 may further include a display device for displaying the log data as described above, an input device for changing the setting values of the air conditioning settings of the air conditioners 30A and 30B, and the like.

Figure 3:
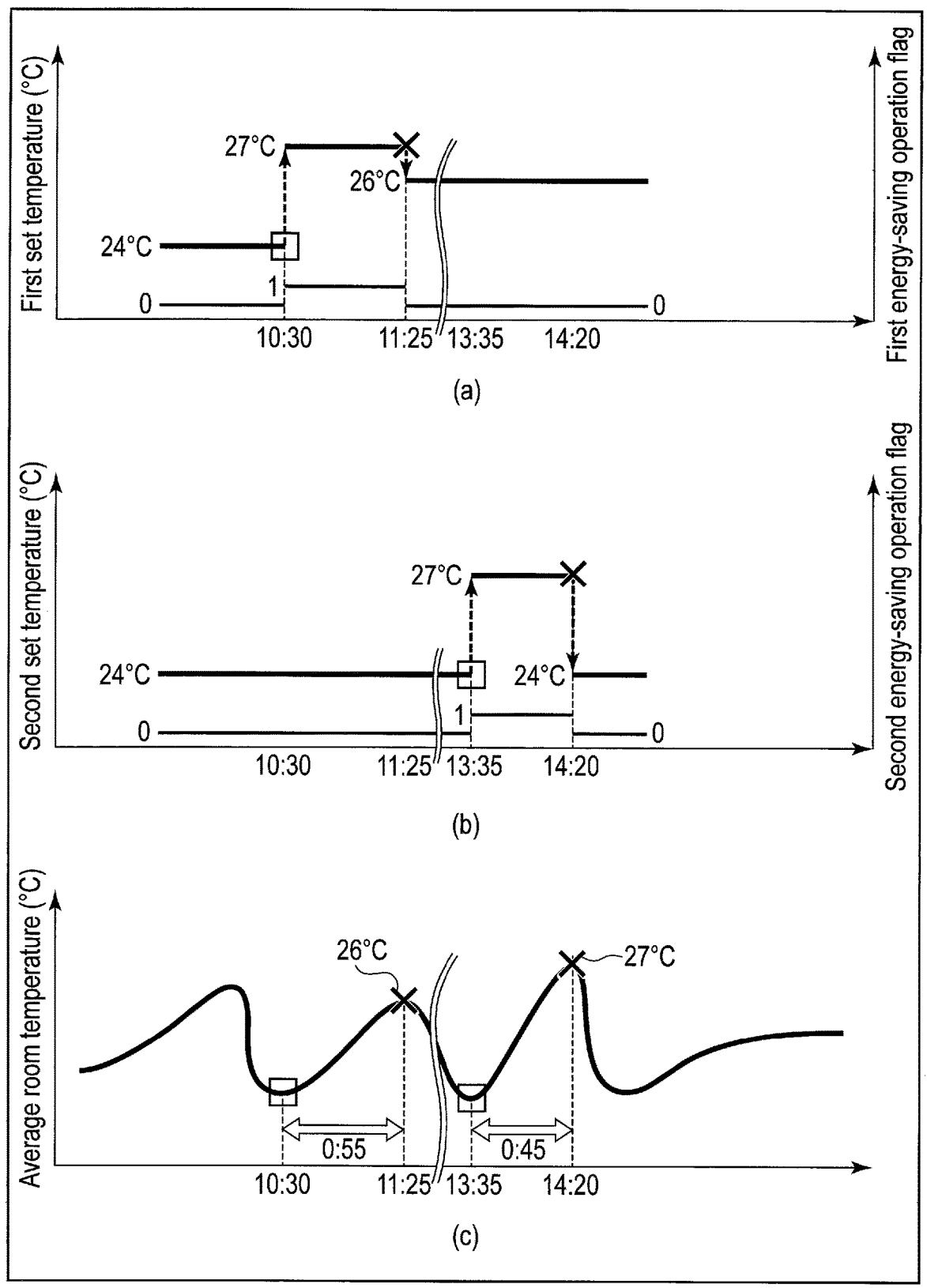
FIG. 3 is a diagram showing a relationship between an energy-saving operation and an indoor air-conditioning state in a case where the operation mode of the air conditioner is a cooling mode.

The log data stored in the log data storage 12 shown in FIG. 1 will be described below. FIG. 3 shows a relationship between the above-described energy-saving operation and the air-conditioning state in the room 20 in the case where the operation mode of the air conditioners 30A and 30B is a cooling mode.

More specifically, the upper part of FIG. 3 shows visualized transition of the set temperature of the air conditioner 30A. A first energy-saving operation flag in the upper part of FIG. 3 indicates whether the air conditioner 30A is in the energy-saving operation or not as described later. The middle part of FIG. 3 shows visualized transition of the set temperature of the air conditioner 30B. A second energy-saving operation flag in the middle part of FIG. 3 indicates whether the air conditioner 30B is in the energy-saving operation or not as described later. The lower part of FIG. 3 shows visualized transition of the average value of the temperature (room temperature) of the room 20 as the set temperatures of the air conditioners 30A and 30B are raised and lowered.

The average value of the room temperature described with reference to FIG. 3 and the like is assumed to be an average value of the temperature distribution in the room 20 measured by the room temperature meters 50A and 50B.

In the example shown in FIG. 3, it is shown that, for example, the energy-saving operation of the air conditioner 30A is turned on at 10:30 when the temperature of the room 20 is lowered by the air conditioning executed by the air conditioners 30A and 30B (i.e., the set temperature of the air conditioner 30A is raised). During the energy-saving operation of the air conditioner 30A, the average value of the temperature in the room 20 gradually increases.

At 11:25 when the average value of the room temperature reaches 26° C., it is assumed that the occupant in the room 20 feels uncomfortable due to the high room temperature. In this case, the occupant can turn off the energy-saving operation of the air conditioner 30A (i.e., lower the set temperature of the air conditioner 30A) by operating the remote controller 40A. According to this, the room temperature falls again such that the comfort of the room 20 can be improved.

It is assumed that the energy-saving operation from 10:30 to 11:25 is executed only by the air conditioner 30A and the set temperature of the air conditioner 30B is not changed.

In contrast, it is shown that, for example, the energy-saving operation of the air conditioner 30B is turned on at 13:35 when the temperature of the room 20 is lowered by the air conditioning executed by the air conditioners 30A and 30B (i.e., the set temperature of the air conditioner 30B is raised). During the energy-saving operation of the air conditioner 30B, the average value of the temperature in the room 20 gradually increases.

At 14:20 when the average value of the room temperature reaches 27° C., it is assumed that the occupant in the room 20 feel uncomfortable due to the high room temperature. In this case, the occupant can turn off the energy-saving operation of the air conditioner 30B (i.e., lower the set temperature of the air conditioner 30B) by operating the remote controller 40B. According to this, the room temperature falls again such that the comfort of the room 20 can be improved.

It is assumed that the energy-saving operation from 13:35 to 14:20 is executed only by the air conditioner 30B and the set temperature of the air conditioner 30A is not changed.

When the air conditioners 30A and 30B can execute the energy-saving operation, the energy-saving operation is often turned on and turned off repeatedly depending on whether the occupant feels comfortable or uncomfortable as shown in FIG. 3.

In the present embodiment, history of the operation conditions of the air conditioners 30A and 30B and the air-conditioning state (for example, room temperature) of the room 20 as described above is stored as log data in the air-conditioning control device 10 (log data storage 12).

FIG. 4 shows an example of the data structure of the log data acquired by the log data acquisition module 11 and stored in the log data storage 12 when the air conditioners 30A and 30B are operated as shown in FIG. 3.

As shown in FIG. 4, the log data includes a first set temperature, a first room temperature, a first energy-saving operation flag, a second set temperature, a second room temperature, a second energy-saving operation flag, and an average room temperature in association with the time.

The time is, for example, the time when the log data is acquired (or stored in the log data storage 12). In FIG. 4, the time is shown for convenience, but the time included in the log data is assumed to be a concept including a date (i.e., date and time).

The first set temperature is a set temperature of the air conditioner 30A. The first room temperature is the temperature of the room 20 measured by the room temperature meter 50A. The first energy-saving operation flag indicates whether the air conditioner 30A is in the energy-saving operation or not as described above. When the first energy-saving operation flag is "0", the flag indicates that the air conditioner 30A is not in the energy-saving operation, and that when the first energy-saving operation flag is "1", the air conditioner 30A is in the energy-saving operation.

The second set temperature is a set temperature of the air conditioner 30B. The second room temperature is the temperature of the room 20 measured by the room temperature meter 50B. The second energy-saving operation flag indicates whether the air conditioner 30B is in the energy-saving operation or not as described above. When the second energy-saving operation flag is "0", the flag indicates that the air conditioner 30B is not in the energy-saving operation, and that when the second energy-saving operation flag is "1", the air conditioner 30B is in the energy-saving operation. The average room temperature is an average value of the first room temperature and the second room temperature.

In the example shown in FIG. 4, log data 121 is stored in the log data storage 12. The log data 121 includes time "10:15", first set temperature "24", first room temperature "24.5", first energy-saving operation flag "0", second set temperature "24", second room temperature "24.5", second energy-saving operation flag "1", and average room temperature "24.50". The log data 121 indicates that, at 10:15, the set temperature of the air conditioner 30A is 24° C., the room temperature measured by the room temperature meter 50A is 24.5° C., and the set temperature of the air conditioner 30B is 24° C., the room temperature measured by the room temperature meter 50B is 24.5° C., and the average room temperature is 24.50° C. In addition, the log data 121 indicates that the air conditioners 30A and 30B are not in the energy-saving operation.

Next, log data 122 stored in the log data storage 12 will be described. The log data 122 includes time "10:30", first set temperature "27", first room temperature "24.0", first energy-saving operation flag "1", second set temperature "24", second room temperature "24.5", second energy-saving operation flag "0", and average room temperature "24.25". The log data 122 indicates that, at 10:30, the set temperature of the air conditioner 30A is 27° C., the room temperature measured by the room temperature meter 50A is 24.0° C., and the set temperature of the air conditioner 30B is 24° C., the room temperature measured by the room temperature meter 50B is 24.5° C., and the average room temperature is 24.25° C. In addition, the log data 121 indicates that the air conditioners 30A and 30B are not in the energy-saving operation.

The first energy-saving operation flag included in the log data stored in the log data storage 12 before the log data 122 (i.e., log data including the time "10:25") is "0". In contrast, the first energy-saving operation flag included in the log data 122 is "1".

According to this, it can be determined that the energy-saving operation of the air conditioner 30A was turned on between 10:25 and 10:30.

In contrast, the log data 123 includes time "11:25", first set temperature "26", first room temperature "26.5", the first energy-saving operation flag "0", second set temperature "24", second room temperature "25.5", first energy-saving operation flag "0", and average room temperature "26.00". The log data 123 indicates that, at 11:25, the set temperature of the air conditioner 30A is 26° C., the room temperature measured by the room temperature meter 50A is 26.5° C., and the set temperature of the air conditioner 30B is 24° C., the room temperature measured by the room temperature meter 50B is 25.5° C., and the average room temperature is 26.00° C. In addition, the log data 123 indicates that the air conditioners 30A and 30B are not in the energy-saving operation.

The first energy-saving operation flag included in the log data stored in the log data storage 12 one time before the log data 123 (i.e., log data including the time "11:20") is "1". In contrast, the first energy-saving operation flag included in the log data 123 is "0". According to this, it can be determined that the energy-saving operation of the air conditioner 30A was turned off between 11:20 and 11:25.

Although details are omitted, it can be determined according to the log data 124 shown in FIG. 4 that the energy-saving operation of the air conditioner 30B was turned on from 13:30 to 13:35, and it can be determined according to the data 125 that the energy-saving operation of the air conditioner 30B was turned off between 14:15 and 14:20.

Thus, according to the log data stored in the log data storage 12, the time when the energy-saving operation of each of the air conditioners 30A and 30B was turned on (time when the air-conditioning setting is relaxed), the time when the energy-saving operation was turned off (time when the air-conditioning setting is strengthened), and the air-conditioning state (for example, average room temperature) of the room 20 during that time can be specified.

Only the log data 121 to 125 has been described here, but the other log data is considered in the same manner. In addition, only a part of the log data stored in the log data storage 12 is shown in FIG. 4, but all log data acquired during the operations of the air conditioners 30A and 30B is assumed to be stored in the log data storage 12. The log data for which a predetermined period has elapsed after being stored in the log data storage 12, of the log data stored in the log data storage 12, may be discarded.

In FIG. 4, the log data is stored in the log data storage 12 such that the time is set at intervals of 5 minutes (i.e., the log data is accumulated at intervals of 5 minutes), but the log data may be accumulated at different intervals as long as the start and cancellation can be determined. Furthermore, the interval at which log data is accumulated is not a fixed time interval but may be irregular.

In addition, in the present embodiment, it has been described that the energy-saving operation flag (first and second energy-saving operation flags) is managed for each of the air conditioners 30A and 30B, but the energy-saving operation flag may be managed for each of rooms (indoor) where air conditioners are installed.

Figure 5:
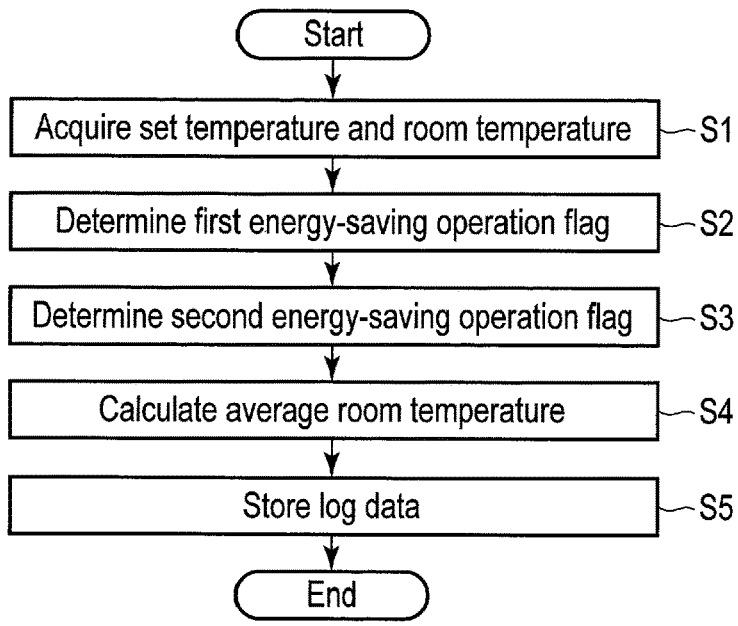
FIG. 5 is a flowchart showing an example of a procedure of log data acquisition processing.

Next, the operations of the air-conditioning control device 10 according to the present embodiment will be described. First, a procedure of acquiring the log data (hereinafter referred to as log data acquisition processing) will be described with reference to a flowchart of FIG. 5. The log data acquisition processing is executed at a predetermined interval (for example, every five minutes) by the log data acquisition module 11 included in the air-conditioning control device 10. The operation mode of the air conditioners 30A and 30B will be described as the cooling mode.

The log data acquisition module 11 acquires the set temperature of the air conditioner 30A, the room temperature measured by the room temperature meter 50A, the set temperature of the air conditioner 30B, and the room temperature measured by the room temperature meter 50B from each of the air conditioners 30A and 30B (step S1).

Next, the log data acquisition module 11 determines a first energy-saving operation flag, based on the set temperature of the air conditioner 30A acquired in step S1 and the latest log data (the latest from the current time), of the log data stored in the log data storage 12 (step S2).

The process of step S2 will be specifically described below. The process will be described separately in a case where the air conditioner 30A is not in the energy-saving operation and a case where the air conditioner 30A is in the energy-saving operation.

Whether the air conditioners 30A and 30B are in the energy-saving operation or not can be determined based on the first and second energy-saving operation flags included in the latest log data.

First, the process of step S2 in the case where the air conditioner 30A is not in an energy-saving operation will be described.

When the air conditioner 30A is not in the energy-saving operation, if the set temperature of the air conditioner 30A acquired in step S1 is higher than the first set temperature included in the latest log data, i.e., the set temperature of the air conditioner 30A is increased (the air-conditioning setting is eased), it is determined that the energy-saving operation of the air conditioner 30A has been turned on. In contrast, when the set temperature of the air conditioner 30A acquired in step S1 is the same as or lower than the first set temperature included in the latest log data, it is determined that the energy-saving operation of the air conditioner 30A is not turned on (i.e., the normal operation is continued) since the set temperature of the air conditioner 30A is not raised.

When it is determined that the energy-saving operation of the air conditioner 30A is turned on as described above, "1" is determined as the first energy-saving operation flag in step S2. In contrast, when it is determined that the energy-saving operation of the air conditioner 30A is not turned on, "0" is determined as the first energy-saving operation flag in step S2.

Next, the process of step S2 in the case where the air conditioner 30A is in the energy-saving operation will be described.

When the air conditioner 30A is in an energy-saving operation, if the set temperature of the air conditioner 30A acquired in step S1 is lower than the first set temperature included in the latest log data, i.e., the set temperature of the air conditioner 30A is lowered (the air conditioning setting is made strong), it is determined that the energy-saving operation of the air conditioner 30A is turned off. In contrast, when the set temperature of the air conditioner 30A acquired in step S1 is the same as or higher than the first set temperature included in the latest log data, it is determined that the energy-saving operation of the air conditioner 30A is not turned off (i.e., the energy-saving operation is continued) since the set temperature of the air conditioner 30A is not lowered.

When it is determined that the energy-saving operation of the air conditioner 30A is turned off as described above, "0" is determined as the first energy-saving operation flag in step S2. In contrast, when it is determined that the energy-saving operation of the air conditioner 30A is not turned off, "1" is determined as the first energy-saving operation flag in step S2.

Next, the log data acquisition module 11 determines a second energy-saving operation flag, based on the set temperature of the air conditioner 30B acquired in step S1 and the latest log data of the log data stored in the log data storage 12 (step S3).

The process of step S3 is the same as the process of step S2 except for the point that the set temperature of the air conditioner 30A acquired in step S1 and the first set temperature included in the latest log data are set as the set temperature of the air conditioner 30B acquired in step S1 and the second set temperature included in the latest log data, and their detailed descriptions are omitted here.

The log data acquisition module 11 calculates the average value of the room temperature acquired in step S1 (the room temperature measured by the room temperature meters 50A and 50B) as the average room temperature (step S4).

When the process of step S4 is executed, the log data acquisition module 11 stores the log data including the set temperature (first set temperature) of the air conditioner 30A and the room temperature (first room temperature) measured by the room temperature meter 50A acquired in step S1, the first energy-saving operation flag determined in step S2, the set temperature (second set temperature) of the air conditioner 30B and the room temperature (second room temperature) measured by the room temperature meter 50B acquired in step S1, the second energy-saving operation flag determined in step S2, and the average room temperature calculated in step S4, in the log data storage 12, for example, in association with the current time (step S5).

According to the log data acquisition process described above, the log data as described in FIG. 4 can be automatically acquired and stored in the log data storage 12, based on the set temperatures from the air conditioners 30A and 30B and the room temperature.

It has been described that the operation mode of the air conditioners 30A and 30B is the cooling mode but, when the operation mode is the heating mode, the processes of determining the first and second energy-saving operation flags in steps S2 and S3 are different. That is, in step S2, for example, if the set temperature of the air conditioner 30A is lowered when the air conditioner 30A is not in the energy-saving operation, it is determined that the energy-saving operation has been turned on and "1" is determined as the first energy-saving operation flag. In contrast, when the air conditioner 30A is in the energy-saving operation and the set temperature of the air conditioner 30A is raised, it is determined that the energy-saving operation has been turned off, and "0" is determined as the first energy-saving operation flag. The operation is the same as that in step S3.

In addition, it has been described that when the log data acquisition process is executed, whether the air conditioners 30A and 30B are in the energy-saving operation or not can be determined based on the first and second energy-saving operation flags included in the latest log data of the log data stored in the log data storage 12 but, when the latest log data does not exist, immediately after the power supplies of the air conditioners 30A and 30B are turned on, for example, log data including the first and second energy-saving operation flags "0" is stored (i.e., "0" is determined as the first and second energy-saving operation flags in steps S2 and S3). The first and second energy-saving operation flags in this case may be determined based on, for example, the set temperatures and operation modes of the air conditioners 30A and 30B.

In the log data acquisition process described above, it has been described that the energy-saving operation flag is determined on the air-conditioning control device 10 side but, for example, information indicating whether the air conditioners 30A and 30B are in the energy-saving operation or not may be information acquired from the air conditioners 30A and 30B.

The air-conditioning control device 10 according to the present embodiment can turn off the energy-saving operation of each of the air conditioners 30A and 30B by constructing a discomfort probability model based on the log data described above and estimating the discomfort degree of the occupant using the constructed discomfort probability model.

A process for constructing the discomfort probability model (hereinafter referred to as model construction process) and a process for estimating the discomfort degree of the occupant (hereinafter referred to as discomfort degree estimation process) in the present embodiment will be described below.

Figure 6:
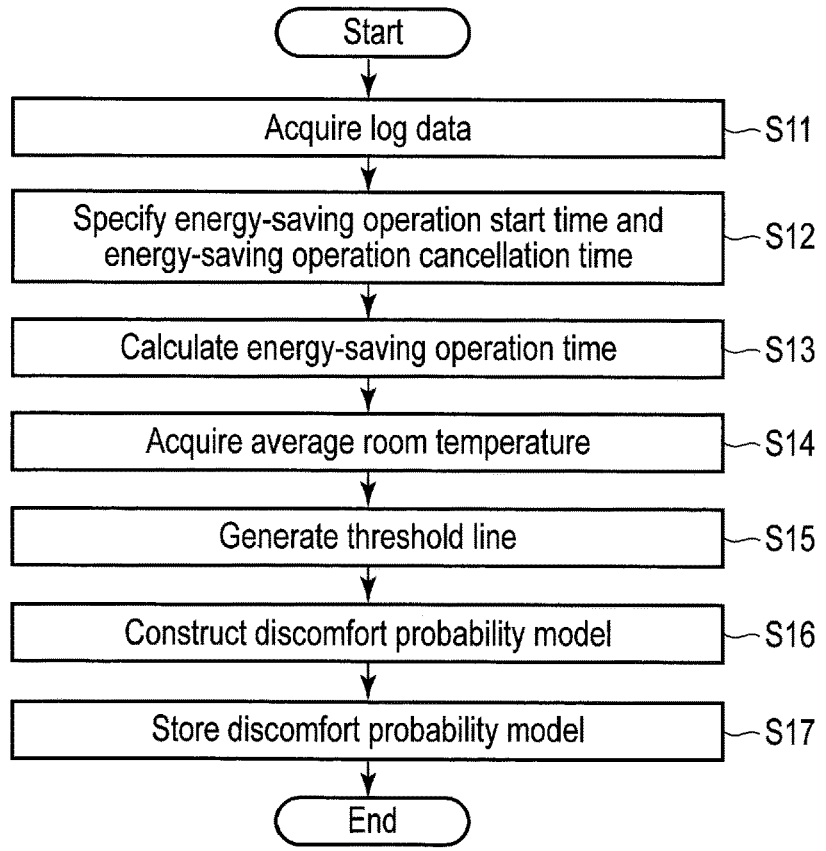
FIG. 6 is a flowchart showing an example of a procedure of a model construction process.

First, the procedure of the model construction process will be described with reference to a flowchart of FIG. 6. The process shown in FIG. 6 is executed by the model construction module 13 included in the air-conditioning control device 10. It is assumed that a plurality of elements of log data are already stored (accumulated) in the log data storage 12.

The model construction module 13 acquires the log data stored in the log data storage 12 (step S11).

Next, the model construction module 13 specifies the energy-saving operation start time (date and time) and the energy-saving operation cancellation time (date and time) for each of the air conditioners 30A and 30B, based on the acquired log data (step S12). The energy-saving operation start time is the time when the energy-saving operation is turned on as described above, and the energy-saving operation cancellation time is the time when the energy-saving operation is turned off.

The energy-saving operation start time of the air conditioner 30A corresponds to the time when the first energy-saving operation flag included in the log data is changed from "0" to "1". In contrast, the energy-saving operation cancellation time of the air conditioner 30A corresponds to the time when the first energy-saving operation flag included in the log data is changed from "1" to "0". In addition, the energy-saving operation start time of the air conditioner 30B corresponds to the time when the second energy-saving operation flag included in the log data is changed from "0" to "1". In contrast, the energy-saving operation cancellation time of the air conditioner 30B corresponds to the time when the second energy-saving operation flag included in the log data is changed from "1" to "0".

The model construction module 13 calculates the time from the energy-saving operation start time specified in step S12 to the energy-saving operation cancellation time (hereinafter referred to as energy-saving operation time) (step S13). The energy-saving operation time corresponds to a time elapsed after the energy-saving operation is turned on and before the occupant feels uncomfortable and the operation of changing the set temperature (i.e., turning off the energy-saving operation) is operated.

When the process of step S13 is executed, the model construction module 13 acquires the average room temperature at the time of the energy-saving operation cancellation time (step S14). In this case, the model construction module 13 acquires the average room temperature included in the log data including the energy-saving operation cancellation time.

The processes of steps S12 to S14 described above will be specifically described with reference to FIG. 4.

First, according to the log data shown in FIG. 4, in step S12, 10:30, i.e., the time included in the log data 122 in which the first energy-saving operation flag is changed from "0" to "1" is specified as the energy-saving operation start time of the air conditioner 30A. In addition, 11:25, i.e., the time included in the log data 123 in which the first energy-saving operation flag is changed from "1" to "0" is specified as the energy-saving operation cancellation time of the air conditioner 30A. In this case, in step S13, 55 minutes is calculated as the energy-saving operation time of the air conditioner 30A. In this case, in step S14, 26.00° C., i.e., the average room temperature included in the log data 123 is acquired.

Similarly, in step S12, 13:35, i.e., the time included in the log data 124 in which the second energy-saving operation flag is changed from "0" to "1" is specified as the energy-saving operation start time of the air conditioner 30B. In addition, 14:20, i.e., the time included in the log data 125 in which the second energy-saving operation flag is changed from "1" to "0" is specified as the energy-saving operation cancellation time of the air conditioner 30B. In this case, in step S13, 45 minutes is calculated as the energy-saving operation time of the air conditioner 30B. In this case, in step S14, 27.00° C., i.e., the average room temperature included in the log data 125, is acquired.

FIG. 7 shows the relationship between the energy-saving operation time calculated in step S13 and the average room temperature acquired in step S14 (i.e., the average room temperature at cancellation of the energy-saving operation) as visualized as a plane scatter diagram. In FIG. 7, the average room temperature is represented by the vertical axis and the energy-saving operation time is represented by the horizontal axis.

X mark 201 in FIG. 7 indicates the energy-saving operation time "55 minutes" of the air conditioner 30A calculated from the above log data shown in FIG. 4 and the average room temperature "26.00° C." at the time when the energy-saving operation of the air conditioner 30A is turned off.

X mark 202 in FIG. 7 indicates the energy-saving operation time "45 minutes" of the air conditioner 30B calculated from the log data shown in FIG. 4 and the average room temperature "27.00° C." at the time when the energy-saving operation of the air conditioner 30B is turned off.

In the log data shown in FIG. 4, the number of times of the energy-saving operation of each of the air conditioners 30A and 30B is one, but the energy-saving operation is repeated a plurality of times during the period in which all elements of the log data stored in the log data storage 12 are acquired. For this reason, in the model construction process shown in FIG. 6, the processes of steps S12 to S14 are executed for each energy-saving operation specified from the log data acquired in step S11.

FIG. 8 is a graph showing a relationship between the energy-saving operation time obtained by executing processes in steps in S12 to S14 for each energy-saving operation and the average room temperature as visualized as a plane scatter diagram.

Considering that the energy-saving operation is turned off when the occupant feels uncomfortable as described above, each of the X marks in FIG. 8 represents the relationship between the time elapsed after the energy-saving operation is turned on and before the occupant feels uncomfortable (turns off the energy-saving operation) and the average room temperature at that time. In other words, FIG. 8 is considered to indicate how much time is elapsed after the start of energy-saving operation when the occupant feels uncomfortable and at what room temperature the occupant feels uncomfortable.

That is, according to FIG. 8, it can be understood that when the room temperature is high after the start of energy-saving operation, the energy-saving operation is turned off early (i.e., the occupant feels uncomfortable early). In contrast, it can be understood that when the room temperature is sufficiently low, the energy-saving operation is not easily turned off (i.e., the occupant is less likely to feel uncomfortable even in the energy-saving operation).

Accordingly, it is considered that, for example, the shorter the energy-saving operation time and the lower the average room temperature, the lower the discomfort of the occupants (the probability that the occupant turns off the energy-saving operation). In contrast, it is considered that the longer the energy-saving operation time (the time has elapsed after the start of the energy-saving operation) and the higher the average room temperature, the higher the discomfort of the occupant.

In the present embodiment, based on such a viewpoint, for example, a discomfort probability model with respect to a pair of the energy-saving operation time (i.e., time elapsed after the start of the energy-saving operation) and the average room temperature at the time when the energy-saving operation is turned off, is assumed to be constructed.

The descriptions return to FIG. 6 again, and the model construction module 13 generates a threshold line for estimating the discomfort degree of the occupant in the relationship (coordinates in the plane scatter diagram) between each energy-saving operation time and the average room temperature at the time when the energy-saving operation is turned off as shown in FIG. 8 (step S15). The threshold line generated in step S15 is, for example, a curve obtained by classifying a state where the possibility that the occupant feels uncomfortable is low and a state where the possibility that the occupant feels uncomfortable is high. As a classification method for generating the threshold line, for example, a method such as a 1-class support vector machine can be used, but other classification methods may be used.

Figure 9:
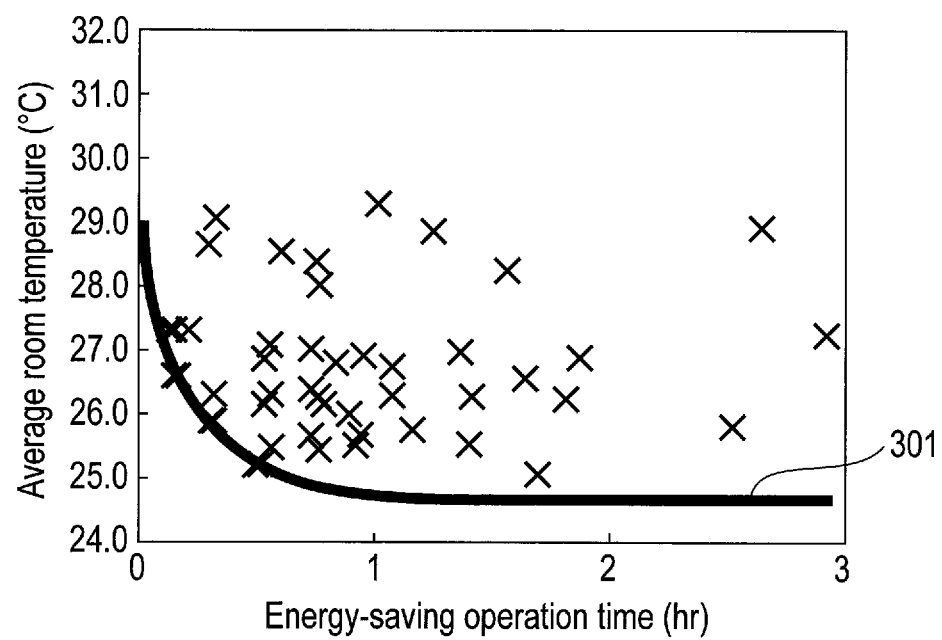
FIG. 9 is a graph showing a threshold line on a plane scatter diagram.

FIG. 9 is a graph showing a threshold line generated in step S15 on a plane scatter diagram shown in FIG. 8. According to the threshold line 301 shown in FIG. 9, the occupant's discomfort degree of the occupant is estimated to be low in the region below the threshold line 301 (energy-saving operation time and average room temperature), and the occupant's discomfort degree is estimated to be high in the region above the threshold line 301 (energy-saving operation time and average room temperature).

The model construction module 13 uses such a threshold line to construct the discomfort probability model in which the relationship among the above-described energy-saving operation time, the average room temperature at the time when the energy-saving operation is turned off, and the discomfort degree (probability that the energy-saving operation is turned off) corresponding to the energy-saving operation time and the average room temperature is defined (step S16).

The discomfort probability model constructed in step S16 is a 3D model in which discomfort is added to the relationship between the energy-saving operation time and the average room temperature at the time when the energy-saving operation is turned off, described with reference to FIG. 7 to FIG. 9. In this discomfort probability model, it is defined that with the above threshold line as a boundary, for example, as the energy-saving operation time is shorter and as the average room temperature is lower, the lower degree of the discomfort level is output, and that as the energy-saving operation time is longer and as the average room temperature is higher, the higher degree of the discomfort is output.

The discomfort probability model generated in step S16 is stored (registered) in the model storage 14 (step S17).

The above-described model construction process (the processing shown in FIG. 6) may be executed when, for example, a predetermined number of elements of log data are stored in the log data storage 12 or may be executed when, for example, log data (for example, log data 123 and 125 shown in FIG. 4) which can determine that the energy-saving operation is turned off is stored in the log data storage 12. In addition, in the initial stage where the number of log data necessary to generate a highly accurate discomfort probability model is not stored in the log data storage 12, log data acquired from other rooms (spaces), buildings, or the like may be prepared in advance and a discomfort probability model may be constructed based on the log data.

In addition, the model construction process is assumed to be executed for each operation mode of the air conditioner. That is, in the present embodiment, a discomfort probability model for the cooling mode is constructed based on the log data acquired when the air conditioners 30A and 30B are operating in the cooling mode, and a discomfort probability model for the heating mode is constructed based on the log data acquired when the air conditioners 30A and 30B are operating in the heating mode.

In the present embodiment, it has been described that the model construction process is executed in the air-conditioning control device 10, but the model construction process may be executed outside the air-conditioning control device 10. In this case, the discomfort probability model constructed by the model construction process executed outside the air-conditioning control device 10 only needs to be stored in the model storage 14.

In addition, the discomfort probability model stored in the model storage 14 may be updated, based on the log data newly stored in the log data storage 12 after the discomfort probability model is constructed.

Figure 10:
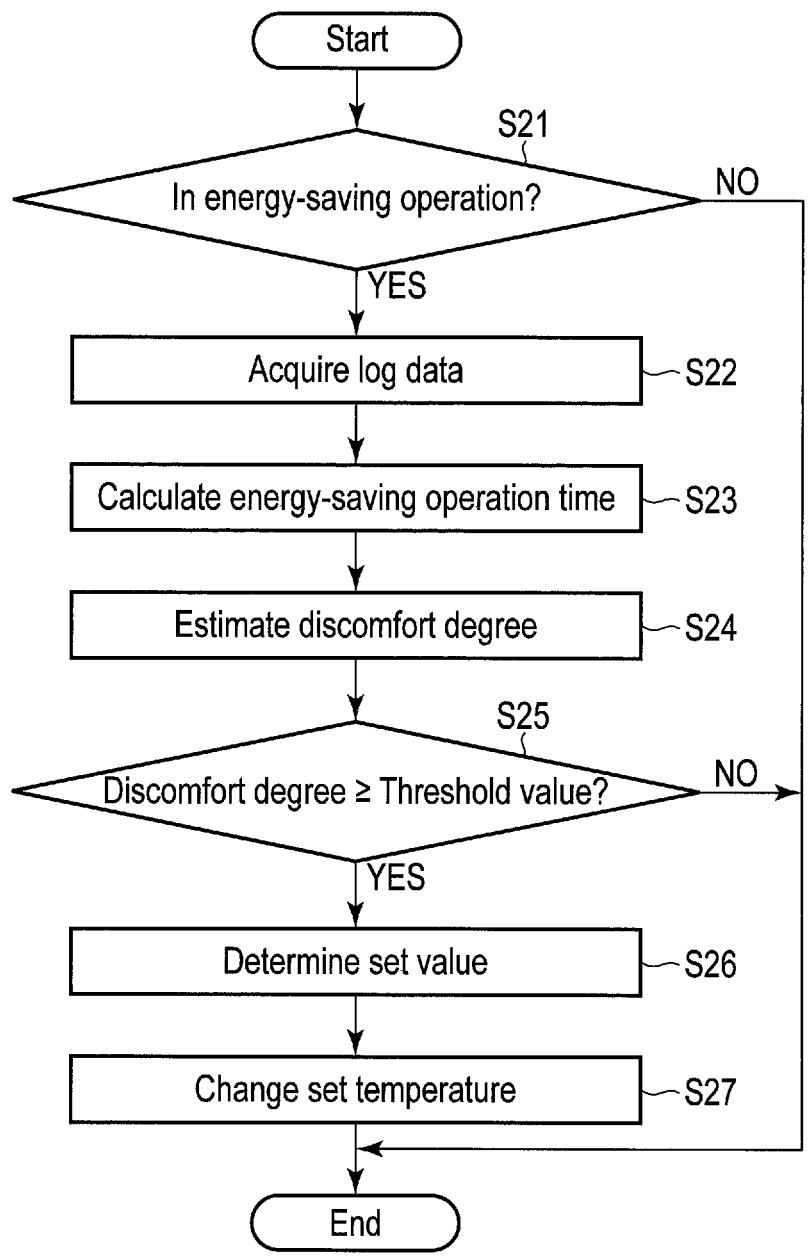
FIG. 10 is a flowchart showing an example of a procedure of discomfort degree estimation processing.

Next, a procedure of the discomfort estimation processing will be described with reference to a flowchart of FIG. 10. The processing shown in FIG. 10 is executed by the discomfort degree estimation module 15 and the operation control module 16 included in the air-conditioning control device 10. The model storage 14 is assumed to store a discomfort probability model constructed by executing the model construction process described above.

First, the discomfort degree estimation module 15 refers to the log data stored in the log data storage 12 to determine whether the air conditioner 30A or the air conditioner 30B is in an energy-saving operation or not (step S21).

In step S21, it is determined that the air conditioner 30A is in the energy-saving operation when the first energy-saving operation flag included in the latest log data of the log data stored in the log data storage 12 is "1", and that the air conditioner 30B is in the energy-saving operation when the second energy-saving operation flag included in the latest log data is "1".

The process in step S21 will be specifically described with reference to FIG. 4. For example, when it is assumed that the processing in FIG. 10 is executed at 10:58, the latest log data is log data including the time "10:55" and the first energy-saving operation flag included in the log data is "1". In this case, it is determined that the air conditioner 30A is in the energy-saving operation. Since the second energy-saving operation flag in this case is "0", the air conditioner 30B is not in the energy-saving operation.

Similarly, for example, when it is assumed that the processing of FIG. 10 is executed at 13:58, the latest log data is log data including the time "13:55", and the second energy-saving operation flag included in the log data is "1". In this case, it is determined that the air conditioner 30B is in the energy-saving operation. Since the first energy-saving operation flag in this case is "0", the air conditioner 30A is not in the energy-saving operation.

In contrast, for example, when the processing of FIG. 10 is executed at 11:28, the latest log data is log data including the time "11:25" and both the first and second energy-saving operation flags included in the log data are "0". In this case, it is determined that the air conditioners 30A and 30B are not in the energy-saving operation.

Similarly, for example, when it is assumed that the processing of FIG. 10 is executed at 14:28, the latest log data is log data including the time "14:25", and both the first and second energy-saving operation flags included in the log data are "0". In this case, it is determined that the air conditioners 30A and 30B are not in the energy-saving operation.

When it is determined in step S21 that the air conditioner 30A or 30B is in the energy-saving operation (YES in step S11), the discomfort degree estimation module 15 acquires from the log data storage 12 the latest log data (hereinafter referred to as the first log data) and the log data (hereinafter referred to as second log data) in which the energy-saving operation flag (first or second energy-saving operation flag) is changed from "0" to "1" (step S22).

The time included in the first log data corresponds to the current time. In contrast, the time included in the second log data corresponds to the time when the energy-saving operation is turned on (energy-saving operation start time).

The discomfort degree estimation module 15 thereby calculates the current energy-saving operation time (the time elapsed after the start of the energy-saving operation before the present time), based on the time included in the first log data and the time included in the second log data and (step S23).

Next, the discomfort level estimation module 15 estimates the discomfort degree of the occupant in the room 20, using the discomfort probability model stored in the model storage 14 (step S24). In this case, the discomfort degree estimation module 15 acquires the average room temperature (i.e., the current average room temperature) included in the first log data as the current air-conditioning state of the room 20, and applies the discomfort probability model to a pair of the energy-saving operation time calculated in step S23 and the acquired average room temperature. According to this, the discomfort degree defined in the discomfort probability model is output in association with the relationship between the current energy-saving operation time and the average room temperature.

In step S24, as described above, the lower discomfort degree is estimated (output) as the energy-saving operation time is shorter and the average room temperature is lower, and the higher discomfort degree is estimated (output) as the energy-saving operation time is longer and the average room temperature is higher.

The discomfort probability model used here is a discomfort probability model (discomfort probability model for cooling or discomfort probability model for heating) corresponding to the operation mode of the air conditioners 30A and 30B.

The discomfort degree estimation module 15 determines whether the discomfort degree thus estimated is greater than or equal to a predetermined value (hereinafter referred to as a threshold value) or not (step S25).

When it is determined that the discomfort degree is greater than or equal to the threshold value (YES in step S25), the operation control module 16 executes a process for turning off the energy-saving operation.

In this case, the operation control module 16 determines the set temperature (the set value of the air-conditioning setting) after turning off the energy-saving operation (step S26). The set temperature determined in step S26 can be set to, for example, a set temperature that is set immediately before the energy-saving operation is turned on. The set temperature that is set immediately before the energy-saving operation is turned on can be acquired from the set temperature (first or second set temperature) of the air conditioner during the energy-saving operation included in the log data immediately before the second log data. The set temperature determined in step S26 may be a temperature that is changed in a direction in which the current set temperature is increased by a predetermined value or, for example, a temperature that is predetermined by a building manager or the like.

The operation control module 16 changes the set temperature of the air conditioner (air conditioner 30A or 30B) in the energy-saving operation to the set temperature determined in step S16 (step S27). For example, when both the air conditioners 30A and 30B are in the energy-saving operation, the set temperatures of the air conditioners 30A and 30B may be changed to the same set temperature (predetermined set temperature) or different set temperatures (set temperatures that are set before the energy-saving operation of the air conditioners 30A and 30B are turned on), respectively.

When the process of step S27 is executed, the operation control module 16 outputs a control signal indicative of the set temperature (cancellation of the energy-saving operation) determined in step S26 to the air conditioner in the energy-saving operation. According to this, the energy-saving operation of the air conditioner in the energy-saving operation is turned off, and the operation at the set temperature changed in step S27 is started.

In contrast, when it is determined in step S21 that the air conditioners 30A and 30B are not in the energy-saving operation (NO in step S21), the processing in FIG. 10 is ended. In addition, when it is determined in step S25 that the discomfort degree is not greater than or equal to the threshold value (less than the threshold value) (NO in step S25), the processing in FIG. 10 is also ended.

The above-described discomfort degree estimation process (the process shown in FIG. 10) is executed periodically, for example. More specifically, the discomfort degree estimation process can be executed every time, for example, new log data is acquired (stored) (i.e., at intervals of 5 minutes), but may be executed at intervals (for example, at intervals of 10 minutes or 30 minutes) longer than the intervals at which the log data is acquired.

As described above, in the present embodiment, the air-conditioning state (for example, average room temperature) of the room 20 is acquired during the energy-saving operation of the air conditioner 30A or 30B, and the discomfort probability model is applied to the acquired air-conditioning state of the air conditioner 30A or 30B and the time elapsed after the start of the energy-saving operation and before the present time (i.e., the current energy-saving operation time), and the energy-saving operation is thereby turned off.

According to the above-described discomfort probability model, the discomfort degree of the occupant in the room 20 can be estimated based on the current air-conditioning state and the energy-saving operation time, and the energy-saving operation is turned off when the discomfort degree is greater than or equal to a threshold value.

In the present embodiment, having such a configuration, the energy-saving operation can be turned off after the start of the energy-saving operation of the air conditioners 30A and 30B (operation with the air-conditioning setting that implements energy saving) and before the occupant feels uncomfortable.

Furthermore, when the energy-saving operation is turned off in the present embodiment, the setting of the air conditioner 30A or 30B in the energy-saving operation is changed to the setting that is conducted before the energy-saving operation is turned on. In the present embodiment, having such a configuration, the discomfort degree increased by continuing the energy-saving operation can be reduced and the occupant's comfort can be improved.

The occupant may turn off the energy-saving operation of the air conditioner 30A or 30B in the energy-saving operation by operating the remote controller 40A or 40B (i.e., change the air-conditioning setting to a direction to strengthen the setting) before the energy-saving operation is turned off by the air-conditioning control device 10 according to the present embodiment.

When the process for turning off the energy-saving operation is further executed although the energy-saving operation is turned off by such an operation (hereinafter referred to as a cancellation operation), the air-conditioning setting may be further strengthened. In this case, the occupant's comfort may not only be impaired, but it may also be contrary to energy saving.

In contrast, in the present embodiment, for example, when the cancellation operation is executed by the occupant during the energy-saving operation of the air conditioner 30A, the log data including the first energy-saving operation flag "0" indicating that the air conditioner 30A is not in the energy-saving operation is stored in the log data storage 12 by the log data acquisition process described above.

In this case, the processes following step S22 are not executed since it is determined that the air conditioner 30A is not in the energy-saving operation in step S21 of the discomfort degree estimation processing shown in FIG. 10. That is, in the present embodiment, when the cancellation operation is executed by the occupant during the energy-saving operation (i.e., the setting of the air conditioner 30A is changed), impairing the occupant's comfort as described above can be avoided and the energy-saving performance can be improved since change of the setting such as turning off the energy-saving operation by the air-conditioning control device 10 is not executed. The case where the air conditioner 30A is in the energy-saving operation has been mainly described, but the same operations are also executed in the case where the air conditioner 30B is in the energy-saving operation.

In the present embodiment, the log data including the date and time when energy-saving operation was turned on in the past, the date and time when the energy-saving operation was turned off by the occupant, and the past air-conditioning state of room 20, is stored (accumulated) in the log data storage 12, and the discomfort probability model can be thereby constructed based on the log data. For example, this discomfort probability model may be constructed (generated) outside the air-conditioning control device 10 and stored in advance in the model storage 14 of the air-conditioning control device 10.

In addition, the operation modes of the air conditioners 30A and 30B include a cooling mode and a heating mode but, when the occupant's discomfort degree is estimated in the case where the air conditioners 30A and 30B are operating in the cooling mode, a discomfort probability model constructed based on log data acquired during operation in the cooling mode is used. In contrast, when the occupant's discomfort degree is estimated in the case where the air conditioners 30A and 30B are operating in the heating mode, the discomfort probability model constructed based on the log data acquired during the operation in the heating mode is used. That is, in the present embodiment, the occupant's discomfort degree can be estimated using different discomfort probability models according to the operation modes of the air conditioners 30A and 30B.

In the present embodiment, as described above, it has been described that the energy-saving operation is turned off when the discomfort degree is greater than or equal to the threshold value, but the discomfort probability model may be a model simply defining the relationship between the energy-saving operation time and the average room temperature. According to such a discomfort probability model, the energy-saving operation can be turned off when, for example, the position (coordinates) on the plane scatter diagram determined by the relationship between the current energy-saving operation time and the average room temperature is located in the region of the state which is classified by the threshold line described above and where the occupant feels uncomfortable at a high probability.

Moreover, in the present embodiment, it has been described that the occupant's discomfort degree using two variables of the energy-saving operation time (time when the air-conditioning setting of an air conditioner is relaxed) and the average room temperature, but air conditioning (for example, cooling) of the air conditioners 30A and 30B is hardly effective at some places in the same room 20 due to solar radiation or heat generated from various devices arranged in the room 20. That is, since the discomfort degree with respect to the air-conditioning state of the room 20 is often biased, the occupant's discomfort degree can hardly be estimated with high accuracy only by monitoring the average room temperature of the room 20.

Figure 11:
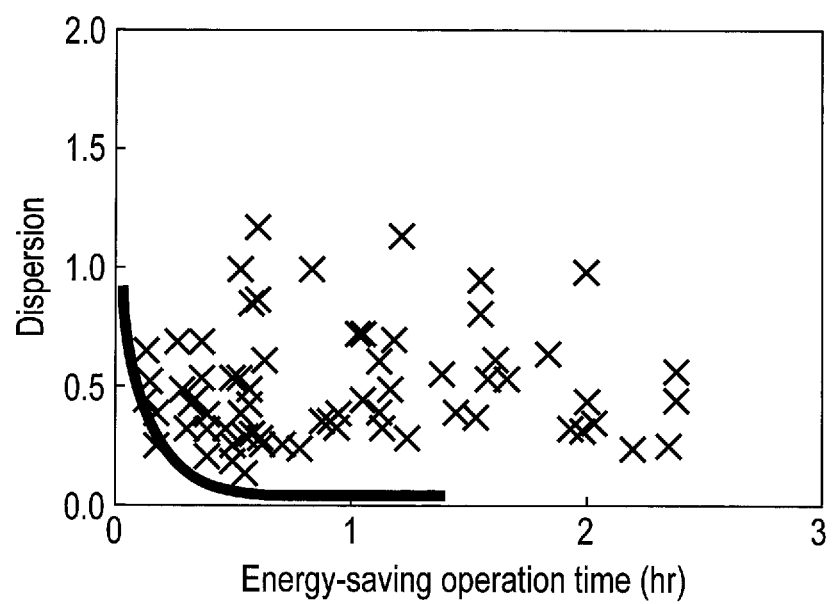
FIG. 11 is a graph showing a relationship between the energy-saving operation time and the variance value obtained for each energy-saving operation as visualized as a plane scatter diagram together with a threshold line.

In order to cope with this, for example, a variance value (unevenness in room temperature) of the room temperature distribution measured by a plurality of room temperature meters including the room temperature meters 50A and 50B may be used instead of the average room temperature described in the present embodiment. At this time, the log data acquisition module 11 calculates a room temperature variance value in step S4. FIG. 11 is a graph showing a relationship between each energy-saving operation time and the variance value as visualized as a plane scatter diagram together with the above threshold line. In this case, a discomfort probability model is constructed based on the variance value of the past temperature (room temperature) of the room 20, and the discomfort probability model is applied to the variance value of the temperature of the room 20 acquired as the current air-conditioning state of the room 20, and the energy-saving operation of the air conditioner in the room 20 with a high discomfort degree can be thereby turned off. According to such a configuration, the discomfort degree can be estimated with a high accuracy since a discomfort probability model corresponding to the air-conditioning state of the place where the effectiveness of air conditioning is likely to be deteriorated (i.e., the occupant is likely to feel uncomfortable) can be constructed.

Using the variance value instead of the average room temperature has been described, but the maximum value or the minimum value of the room temperatures measured by a plurality of room temperature meters can be used in addition to the variance value. In addition, a multivariate model can be constructed by combining some of the average room temperature, variance, maximum value and minimum value of the room temperature.

Furthermore, for example, a room temperature meter arranged at a position capable of measuring a room temperature easily associated with a high discomfort degree, of a plurality of room temperature meters arranged in the room 20, may be automatically selected by using a technique called sparse modeling, and only the room temperature measured by the selected room temperature meter may be used. Such a configuration can cope with a case where, for example, the effectiveness of air conditioning tends to be deteriorated at a plurality of places.

In the present embodiment, using the room temperature measured by the room temperature meters 50A and 50B has been described, but data other than the room temperature may be used. More specifically, the air-conditioning control device 10 according to the present embodiment can be configured as shown in FIG. 12. In FIG. 12, the same parts as those in FIG. 1 are denoted by the same reference numerals.

As shown in FIG. 12, the air-conditioning control device 10 further includes, for example, a weather log storage 17a, a distribution board log storage 17b, and an occupant number log storage 17c.

The weather log storage 17a stores a weather log on which the outside air load of the air conditioners 30A and 30B is reflected. The weather log includes, for example, an outside air temperature, solar radiation, wind speed, and precipitation, but the weather log may be measured by using, for example, various sensors or may be acquired (collected) from an external server device or the like.

The distribution board log storage 17b stores distribution board logs (hereinafter referred to as distribution board logs) on which the heat from various devices (hereinafter referred to as indoor devices) arranged in the room 20 is reflected. The distribution board log includes the operation amount of the indoor device that can be acquired from the distribution board. According to such a distribution board log, heat generation or the like in the indoor device can be obtained.

The occupant number log storage 17c stores a log of the number of occupants in the room 20 (hereinafter referred to as the occupant number log) on which the heat generated by the occupants in the room 20 is reflected. The occupancy number log (the number of occupants) may be acquired using, for example, a time card system related to the occupants in the room 20 or an infrared sensor disposed in the room 20 or the like or may be acquired by analyzing an image of a camera capturing in the room 20.

In the configuration shown in FIG. 12, at least one of a weather log, a distribution board log, and an occupant number log can be used as a variable that causes a heat load in the room 20. That is, the air-conditioning control device 10 may include at least one of the weather log storage 17a, the distribution board log storage 17b, and the occupant log storage 17c shown in FIG. 12.

According to such a configuration, a sign that the occupant feels uncomfortable even before the room temperature actually rises can be captured and a response can be made more appropriately.

The weather log, distribution board log, and occupant number log described above may be used instead of the room temperature described in the present embodiment or may be used in combination with the room temperature.

The weather log, the distribution board log, and the occupant number log have been described as data other than the room temperature. However, the data other than the room temperature may be, for example, data such as humidity and carbon dioxide concentration in the room 20, and the like. The humidity and the carbon dioxide concentration in the room 20 may be measured by a hygrometer and a carbon dioxide concentration meter disposed in the room 20 in the same manner as the room temperature meters 50A and 50B.

In addition, in the present embodiment, the log data has been described as the data including the first and second energy-saving operation flags, but the first and second energy-saving operation flags may not be included in the log data. In this case, for example, the energy-saving operation start time and the energy-saving operation cancellation time in step S12 shown in FIG. 6 may be specified based on changes in the first and second set temperatures included in the log data. The determination processing of determining whether the air conditioners 30A and 30B are in the energy-saving operation or not in step S21 shown in FIG. 10 may also be specified in the same manner.

Furthermore, the log data may be configured not to include the average room temperature. In this case, the average room temperature of the first and second room temperatures included in the log data may be calculated every time the process of step S14 shown in FIG. 6 is executed.

Second Embodiment

Next, a second embodiment will be described. In the above first embodiment, turning off the energy-saving operation of the air conditioner provided in one room based on the discomfort degree estimated using the discomfort probability model has been described but, for example, an upper limit is set on the power consumption of the entire air conditioner, in the energy saving in units of buildings such as demand response to request reduction in energy demand.

The air conditioner includes an indoor unit installed indoors and an outdoor unit installed outdoors and, in a general air conditioner, approximately 90% of the necessary power is consumed by the outdoor unit. For this reason, when an upper limit is set on the power consumption as described above, the operation of the outdoor unit needs to be controlled (changed).

Figure 13:
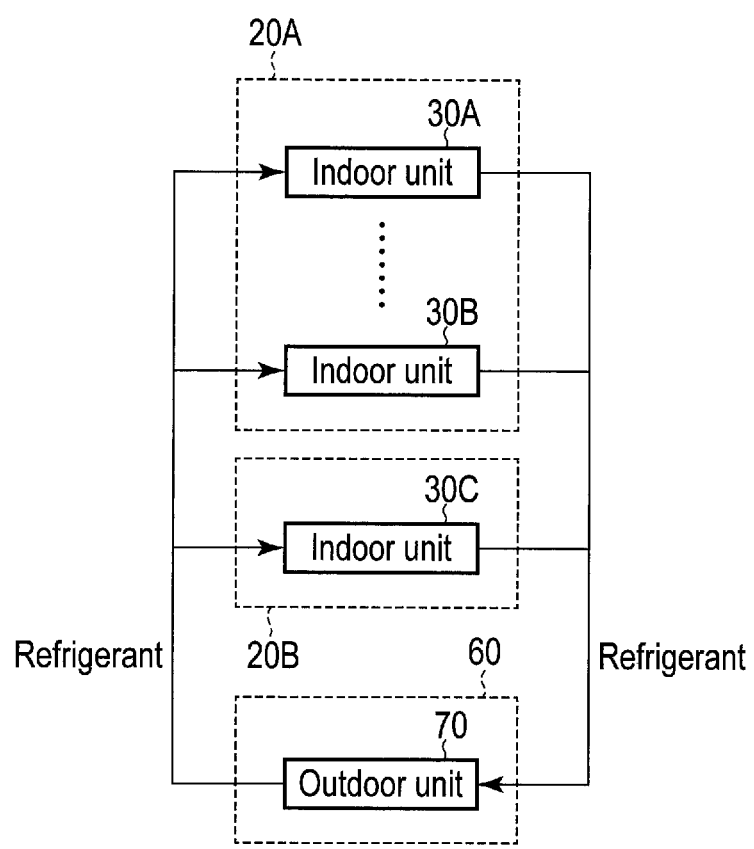
FIG. 13 is a diagram illustrating an air conditioner capable of controlling a plurality of indoor units with one refrigerant system.

In recent years, for example, an air conditioner (multi-air conditioner) capable of controlling a plurality of indoor units with one refrigerant system is known. In such an air conditioner, the system often spreads across a plurality of rooms as shown in FIG. 13. In the example shown in FIG. 13, for example, indoor units 30A and 30B are installed in an room 20A, an indoor unit 30C is installed in a room 20B, and an outdoor unit 70 installed in outdoors 60 distributes heat to the indoor units 30A to 30C via refrigerant pipes.

In the air conditioner as shown in FIG. 13, for example, the operation of the indoor units 30A to 30C is controlled in response to the required amount from each of the indoor units 30A to 30C according to the set temperature and room temperature. In the following descriptions, the required amount from each of the indoor units 30A to 30C includes concepts of the amount of electric power or the amount of heat necessary for air conditioning in each of the indoor units 30A to 30C.

In this case, if the upper limit of power consumption is not set for the whole air conditioning system, the indoor units 30A to 30C can be operated (run) as required by the indoor units 30A to 30C. In contrast, when the upper limit of power consumption is set for the whole air conditioning system, each of the indoor units can be operated by assuming the value obtained by multiplying each of the required amounts from the indoor units 30A to 30C by R as an actual consumption amount (actual consumption) of each indoor unit where a ratio of an upper limit value of the power consumption to the total required amount (i.e., the total amount of power consumption necessary to operate the indoor units 30A to 30C as required by the indoor units 30A to 30C) is R. According to this, the whole air conditioning system can be operated within the range of the upper limit value of power consumption.

The building manager may be able to specify (set) the actual consumption for each indoor unit, but the demand varies from moment to moment, and the building manager can hardly specify the actual consumption for each air conditioner in real time when an upper limit of the power consumption is set for the entire air conditioner.

In the control of the air conditioner based on the upper limit value of the power consumption described above, heat is consumed regardless of the discomfort degree of each of the rooms 20A and 20B, and the air-conditioning capacity of the room of a high discomfort degree (actual consumption of indoor units installed in a room of a high discomfort degree) may be insufficient while heat is consumed in a room of a low discomfort degree. In such a case, from the viewpoint of emphasizing comfort, the upper limit value of power consumption needs to be canceled (i.e., the energy-saving operation of each of the indoor units 30A to 30C needs to be turned off) and, the energy-saving operation is turned off even though the energy-saving operation can be continued in a room of a low discomfort degree, resulting in an opportunity loss.

That is, it is unreasonable that the energy saving time of the entire air conditioner is shortened as the discomfort degree increases (protrudes) in some rooms. In addition, since an indoor unit (for example, indoor unit 30C) closer to the outdoor unit 70 in distance tends to consume more heat, this unreasonableness becomes more remarkable depending on the position of the indoor unit.

Therefore, in the present embodiment, suppressing the discomfort degree of occupants in all the rooms 20A and 20B within a predetermined range by controlling the actual consumption of the indoor units 30A to 30C according to the discomfort degree of the occupants in the rooms 20A and 20B, and thereby continuing the energy-saving operation (operating within the upper limit of power consumption) for a longer time, is implemented.

FIG. 14 shows an example of a configuration of the air-conditioning system including the air-conditioning control device according to the present embodiment. The same parts as those in FIG. 1 described above are denoted by the same reference numerals, and their detailed descriptions are omitted. Parts different from FIG. 1 will be mainly described here.

In addition, since the hardware configuration of the air-conditioning control device 10 according to the present embodiment is the same as that of the first embodiment described above, the device will be described as appropriate with reference to FIG. 2.

In the present embodiment, similarly to FIG. 13 described above, the indoor units 30A and 30B are installed in the room 20A, and the indoor unit 30C is installed in the room 20B. In addition, the outdoor unit 70 installed in the outdoors 60 is connected via a refrigerant pipe so as to distribute heat to the indoor units 30A to 30C.

In FIG. 14, the indoor units 30A and 30B correspond to the air conditioners 30A and 30B in the first embodiment described above. In addition, the indoor unit 30C, a remote controller 40C, and a room temperature meter 50C are the same as the indoor unit 30A, the remote controller 40A, the room temperature meter 50A, and the like except that the location of installation (arrangement) is the room 20B, and their detailed descriptions are omitted.

As shown in FIG. 14, the air-conditioning control device 10 according to the present embodiment includes an installation data storage 18 and an upper limit setting module 19.

The installation data storage 18 stores in advance data (hereinafter referred to as installation data) indicative of the location (room) where each indoor unit is installed.

The upper limit setting module 19 sets an upper limit of power consumption of the entire air conditioner (hereinafter referred to as an upper limit power value). The upper limit power value may be specified by, for example, a building manager or the like, or a predetermined value may be automatically set at a predetermined time.

Although details will be described later, the operation control module 16 in the present embodiment includes a function of controlling the actual consumption of each of the indoor units 30A to 30C, based on the estimation result of the discomfort degree for each of the rooms 20A and 20B by the discomfort degree estimation module 15.

FIG. 15 shows an example of a data structure of the installation data stored in the installation data storage 18 shown in FIG. 14. As shown in FIG. 15, the installation data includes a room ID and an indoor unit ID. The room ID is an identifier for identifying the room in which the indoor unit is installed. The indoor unit ID is an identifier for identifying an indoor unit installed in a room identified by the indoor TD associated with the indoor unit ID.

In the example shown in FIG. 15, the installation data storage 18 stores a plurality of elements of installation data including installation data 181 to 183.

The installation data 181 includes a room ID "20A" and an indoor unit ID "30A". According to the installation data 181, it is indicated that an indoor unit identified by the indoor unit ID "30A" (in this example, the indoor unit 30A) is installed in the room identified by the room ID "20A" (in this example, the room 20A).

The installation data 182 includes a room ID "20A" and an indoor unit ID "30B". According to the installation data 182, it is indicated that an indoor unit identified by the indoor unit ID "30B" (in this example, the indoor unit 30B) is installed in the room identified by the room ID "20A" (in this example, the room 20A).

The installation data 183 includes a room ID "20B" and an indoor unit ID "30C". According to the installation data 183, it is indicated that an indoor unit identified by the indoor unit ID "30C" (in this example, the indoor unit 30C) is installed in the room identified by the room ID "20B" (in this example, the room 20B).

FIG. 16 shows an example of a data structure of the log data stored in the log data storage 12 in the present embodiment. As shown in FIG. 16, the log data includes a first set temperature, a first room temperature, a first energy-saving operation flag, a first required amount, a second set temperature, a second room temperature, a second energy-saving operation flag, a second required amount, a third set temperature, a third room temperature, a third energy-saving operation flag, and a third required amount.

Since the time, the first set temperature, the first room temperature, the first energy-saving operation flag, the second set temperature, the second room temperature, and the second energy-saving operation flag are the same as those in the first embodiment, their detailed descriptions are omitted.

The first required amount indicates a required amount from the indoor unit 30A. The second required amount indicates a required amount from the indoor unit 30B.

The third set temperature is a set temperature of the indoor unit 30C. The third room temperature is the temperature of the room 20B measured by the room temperature meter 50C. The third energy-saving operation flag indicates whether the indoor unit 30C is in the energy-saving operation or not. When the third energy-saving operation flag is "0", the flag indicates that the indoor unit 30C is not in the energy-saving operation, and when the third energy-saving operation flag is "1", the flag indicates that the indoor unit 30C is in the energy-saving operation. The third required amount indicates the required amount from the indoor unit 30C.

That is, in the present embodiment, the log data includes the required amount from each of the indoor units 30A to 30C at the time included in the log data.

Next, the operations of the air-conditioning control device 10 according to the present embodiment will be described. The air-conditioning control device 10 according to the present embodiment executes each of a log data acquisition process and a model construction process, similarly to the first embodiment described above.

First, the log data acquisition process is the same as the above-described first embodiment except for a feature that the required amount included in the log data is acquired from each of the indoor units 30A to 30C as described above (i.e., the log data including the required amount is stored in the log data storage 12), and detailed descriptions are omitted.

Next, the model construction process in the present embodiment is executed for each of the rooms 20A and 20B (i.e., rooms). More specifically, in the model construction process in the present embodiment, the log data stored in the log data storage 12 is divided into log data relating to the rooms 20A and 20B, and the above-described process shown in FIG. 6 is executed for each of the log data relating to the rooms 20A and 20B. The discomfort probability model is thereby constructed for each of the rooms 20A and 20B.

In the present embodiment, the log data related to the room 20A is log data including the time, the first set temperature (the set temperature of the indoor unit 30A), the first room temperature (the room temperature measured by the room temperature meter 50A), the first energy-saving operation flag (flag indicating whether the indoor unit 30A is in an energy-saving operation or not), the second set temperature (the set temperature of the indoor unit 30B), the second room temperature (the room temperature measured by the room temperature meter 50B), and the second energy-saving operation flag (flag indicating whether the indoor unit 30B is in an energy-saving operation or not), which are shown in FIG. 16. When the process shown in FIG. 6 is executed based on the log data related to the room 20A, for example, an average value calculated based on the first room temperature and the second room temperature is acquired in step S14.

In contrast, in the present embodiment, the log data related to the room 20B is log data including the time, the third set temperature (the set temperature of the indoor unit 30C), the third room temperature (the room temperature measured by the room temperature meter 50C), and the third energy-saving operation flag (flag indicating whether the indoor unit 30C is in an energy-saving operation or not), which are shown in FIG. 16.

When the process shown in FIG. 6 is executed based on the log data related to the room 20B, for example, the third room temperature is acquired in step S14.

The log data relating to the rooms 20A and 20B described above can be acquired from the log data storage 12 by specifying the indoor units installed in the respective rooms 20A and 20B based on the installation data stored in the installation data storage 18.

In the present embodiment, as described above, a process of controlling the actual consumption of the indoor units 30A to 30C in accordance with the discomfort degree of the occupants in the rooms 20A and 20B (hereinafter referred to as an actual consumption control process) is executed.

The procedure of the actual consumption control processing in the present embodiment will be described with reference to a flowchart of FIG. 17.

First, the discomfort degree estimation module 15 determines whether the upper limit power value (unit: W) is set or not by the upper limit setting module 19 (step S31).

When it is determined that the upper limit power value is set (YES in step S31), the discomfort degree estimation module 15 executes the discomfort degree estimation process (step S32). In the discomfort degree estimation process in step S32, the above-described processes in steps S21 to S25 shown in FIG. 10 are executed for each of the rooms 20A and 20B. According to this, in step S32, the room having a discomfort level greater than or equal to the threshold value, of the rooms 20A and 20B, can be specified.

In the following descriptions, it is assumed that the room where the discomfort degree is greater than or equal to the threshold value is the room 20A and the discomfort degree of the room 20B is not greater than or equal to the threshold value. In this case, it is assumed that at least one of the indoor units (in this example, the indoor units 30A and 30B) installed in the room 20A is in the energy-saving operation. The energy-saving operation in the present embodiment is indicative of a state in which an operation is executed with an actual consumption smaller than the required amount from the air conditioner.

In this case, the operation control module 16 specifies a set of indoor units installed in a room having the discomfort degree greater than or equal to a threshold value (hereinafter referred to as an indoor unit set) by referring to the installation data storage 18 (step S33). As described above, when the room having the discomfort degree greater than or equal to the threshold value is assumed to be the room 20A, the indoor units 30A and 30B are specified as the indoor unit set in step S33.

Next, the operation control module 16 acquires required amounts (first and second required amounts) of the respective indoor units 30A and 30B included in the latest log data, of the log data stored in the log data storage 12 (step S34). The required amounts acquired in step S34 correspond to the current required amounts of the indoor units 30A and 30B.

When the process of step S34 is executed, the operation control module 16 calculates E by the following equation (1) (step S35).

$$E = L - \Sigma_{k \in U} S_k \quad \text{Equation (1)}$$

In equation (1), L represents the upper limit power value, U represents an indoor unit set, and k represents an indoor unit (number) belonging to the indoor unit set. In addition, Sk represents a required amount (unit: W) of the indoor unit k.

That is, E calculated in step S35 is a value obtained by subtracting the total amount of power consumption necessary for operating each of the indoor units k (in this example, the indoor units 30A and 30B) belonging to the indoor unit set U as required, from the above upper limit power value L. In other words, E is indicative of the amount of power which the indoor unit 30C installed in the room 20B having a low discomfort degree can consume when the indoor units 30A and 30B installed in the room 20A having a high discomfort degree are operated as required.

Next, the operation control module 16 determines whether E calculated in step S35 is a value larger than 0 (i.e., E>0) or not (step S36).

When it is determined that E is a value larger than 0 (YES in step S36), the operation control module 16 determines the actual consumption (unit: W) of each of the indoor units 30A to 30C according to the following equations (2) and (3) (step S37).

$$S_k' = S_k (k \in U) \quad \text{Equation (2)}$$

$$\text{Proportionally divide } S_k' = E \text{ by } \{S_k | k \notin U\} (k \notin U) \quad \text{Equation (3)}$$

According to equation (2), the actual consumption Sk' of each indoor unit k belonging to the indoor unit set U specified in step S33 is assumed to be the required amount Sk of each indoor unit k. That is, the actual consumption of the indoor unit 30A installed in the room 20A having a high degree of discomfort is assumed to be the required amount of the indoor unit 30A, and the actual consumption of the indoor unit 30B is assumed to be the required amount of the indoor unit 30B. In this case, each of the indoor units 30A and 30B can be operated with an actual consumption as required.

On the other hand, according to equation (3), the actual consumption Sk' of each indoor unit k that does not belong to the indoor unit set U specified in step S33 is assumed to be a value obtained by dividing E calculated in step S35 by required amount Sk of the indoor unit k. Since the indoor unit that does not belong to the indoor unit set (i.e., the indoor unit installed in the room 20B having a low discomfort degree) is the only indoor unit 30C, the actual consumption of the indoor unit 30C is the same value as E.

For example, when two indoor units that do not belong to the indoor unit set U (hereinafter referred to as indoor units k1 and k2) are installed and the required amounts of the two indoor units k1 and k2 are Sk1 and Sk2, respectively, an actual consumption Sk1' of the indoor unit k1 whose required amount is Sk1 is E*Sk1/(Sk1+Sk2). Similarly, an actual consumption Sk2' of the indoor unit k2 whose required amount is Sk2 is E*Sk2/(Sk1+Sk2). When three or more indoor units do not belong to the indoor unit set U, the actual consumption is obtained in the same manner.

When the actual consumption of the indoor unit 30C which does not belong to the indoor unit set determined in step S37 is larger than the required amount of the indoor unit 30C, the actual consumption of the indoor unit 30C may be the same value as the required amount of the indoor unit 30C.

When the process of step S37 is executed, the operation control module 16 transmits the actual consumption of each of the indoor units 30A to 30C determined in step S37 to the outdoor unit 70 as a control signal (step S38). According to this, the outdoor unit 70 operates so as to operate each of the indoor units 30A to 30C based on the actual consumption of each of the indoor units 30A to 30C transmitted from the air-conditioning control device 10 (operation control module 16).

In contrast, when it is determined in step S36 that E is not a value larger than 0 (NO in step S36), each of the indoor units 30A to 30C cannot be operated within the range of the upper limit power value, and the operation control module 16 thereby cancels the upper limit power value (step S39).

Figure 17:
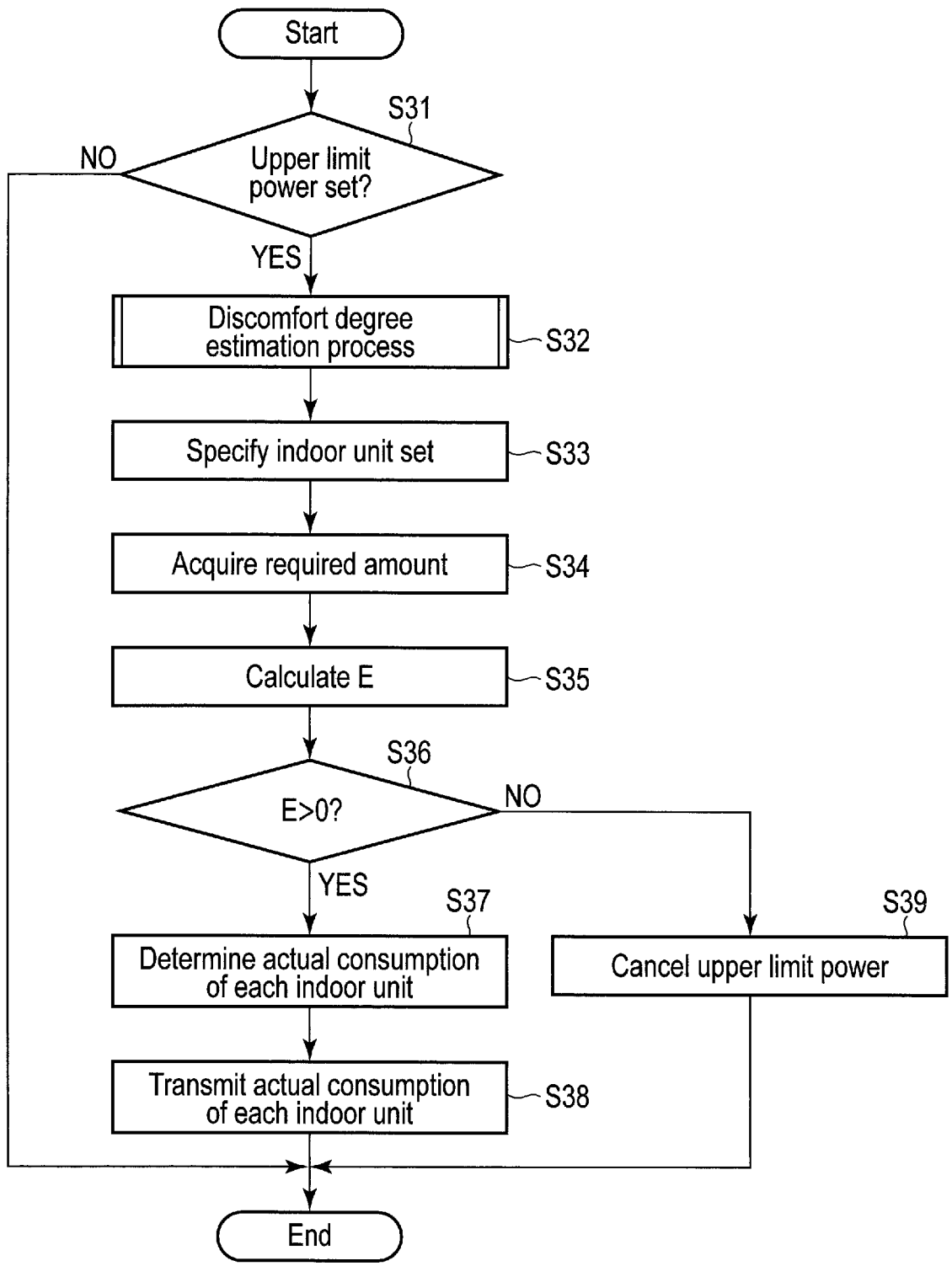
FIG. 17 is a flowchart showing an example of a procedure of actual consumption control processing.

Moreover, when it is determined that the upper limit power value is not set in step S31 (NO of step S31), the actual consumption control process shown in FIG. 17 is ended.

It is assumed that the above-described actual consumption control process (the process shown in FIG. 17) is executed, for example, periodically. More specifically, the actual consumption control process can be executed, for example, every time new log data is acquired (stored) (i.e., at intervals of 5 minutes), but may be executed at an interval (for example, an interval of 10 minutes or an interval of 30 minutes) longer than the interval at which the log data is acquired.

In addition, it has been described that the actual consumption control process is ended when the upper limit power value is not set, in FIG. 17, but, when the upper limit power value is not set, the above-described processing shown in FIG. 10 may be executed. According to this, the energy-saving operation of the indoor units 30A to 30C installed in the rooms 20A and 20B can be turned off according to the discomfort degree of the occupants in the rooms 20A and 20B. Since the discomfort probability model is constructed for each of the rooms 20A and 20B (i.e., rooms) as described above, the processing shown in FIG. 10 is executed for each of the rooms 20A and 20B.

As described above, in the present embodiment, for example, during the energy-saving operation of the indoor units 30A to 30C, the discomfort degree of the occupants in the rooms 20A and 20B (first and second rooms) is estimated and, when the discomfort degree of the occupant in the room 20A is greater than or equal to the threshold value, the energy-saving operation of the indoor units 30A and 30B (first air conditioners) installed in the room 20A is turned off to urge the indoor units to be normally operated, and the indoor unit 30C (second indoor unit) installed in the room 20B is urged to continue the energy-saving operation with power E obtained by subtracting the amount of power necessary for normal operation of the indoor units 30A and 30B from the upper limit power value (the upper limit of power consumption of the indoor units 30A to 30C and the outdoor unit 70). The normal operation of the indoor unit is indicative of operating the indoor unit as required from the indoor unit (i.e., operating using the required amount from the indoor unit as the actual consumption).

In the present embodiment, having such a configuration, since the indoor units 30A and 30B installed in the room 20A having a high discomfort degree can be normally operated as required in order to eliminate the uncomfortable state and since the indoor unit 30C installed in the room 20B having a low discomfort degree can be urged to execute the energy-saving operation within the range of the upper limit power value, both comfort and energy-saving performance for the occupants in each room 20A and 20B can be achieved.

In the present embodiment, it has been described that the actual consumption of each of the indoor units 30A to 30B is controlled (restricted) via the outdoor unit 70, but the actual consumption of each of the indoor units 30A to 30C may be controlled not via the outdoor unit 70, but directly. In addition, the present embodiment may be configured in combination with the first embodiment described above. For example, the air-conditioning control device 10 according to the present embodiment may be include a weather log storage 17a, a distribution board log storage 17b, an occupant number log storage 17c or the like.

According to at least one embodiment described above, the air-conditioning control device, the air-conditioning system, the air-conditioning control method, and program that can turn off the energy-saving operation before the occupant feels uncomfortable when the air conditioner is in an energy-saving operation, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An air-conditioning control device, comprising:
model storage configured to store a discomfort probability model which estimates a value of discomfort of an occupant by a time elapsed after an energy-saving operation of an air conditioner installed in a room is turned on and before the energy-saving operation is turned off by the occupant, and an air-conditioning state of the room at the time when the energy-saving operation is turned off; and
a processor configured to:
acquire a current air-conditioning state of the room during the energy-saving operation of the air conditioner; and
estimate the value of the discomfort of the occupant in the room, by applying the discomfort probability model to the time elapsed after the energy-saving operation is turned on and before the present time and the acquired air-conditioning state;
turn off the energy-saving operation when the estimated value of the discomfort is larger than or equal to a predetermined value.

2. The air-conditioning control device of claim 1, wherein the processor is configured to change settings of the air conditioner to settings conducted before the energy-saving operation is turned on.

3. The air-conditioning control device of claim 2, wherein the processor is configured not to change the settings of the air conditioner when the settings of the air conditioner have been changed by the occupant during the energy-saving operation of the air conditioner.

4. The air-conditioning control device of claim 1, further comprising:
log data storage configured to store log data including a date and time when the energy-saving operation has been turned on in the past, a date and time when the energy-saving operation has been turned off by the occupant, and a past air-conditioning state of the room, wherein
the processor is configured to construct the discomfort probability model, based on the log data.

5. The air-conditioning control device of claim 4, wherein the past air-conditioning state of the room included in the log data includes a past temperature of the room, and the processor is configured to:
construct the discomfort probability model, based on the variance value of the past temperature of the room included in the log data; and
acquire the variance value of the temperature of the room during the energy-saving operation of the air conditioner as the air-conditioning state of the room.

6. An air-conditioning system, comprising:
the air-conditioning control device of claim 1; and
an air conditioner operating based on a signal output by the processor.

7. An air-conditioning control device controlling a first air conditioner installed in a first room and a second air conditioner installed in a second room, the air-conditioning control device comprising:
model storage configured to store a discomfort probability model with respect to a time elapsed after an energy-saving operation of the first air conditioner is turned on and before the energy-saving operation is turned off by the occupant, and an air-conditioning state of the first room at the time when the energy-saving operation is turned off; and
a processor configured to:
set an upper limit of power consumption at a whole air conditioning system including the first air conditioner and the second air conditioner;
acquire the air-conditioning state of the first room during the energy-saving operation of the first air conditioner and the second air conditioner;
estimate discomfort of an occupant in the first room by applying the discomfort probability model to the time elapsed before the energy-saving operation of the first air conditioner is turned on and before the present time and the acquired air-conditioning state; and
turn the energy-saving operation of the first air conditioner off when the estimated discomfort is larger than a predetermined value, and turn the energy-saving operation of the second air conditioner stronger so that the power consumption of the whole air conditioning system is under the limit.

8. An air-conditioning control method executed by an air-conditioning control device comprising at least one processor and a model storage configured to store a discomfort probability model which estimates a value of discomfort of an occupant by a time elapsed after an energy-saving operation of an air conditioner installed in a room is turned on and before the energy-saving operation is turned off by the occupant, and an air-conditioning state of the room at the time when the energy-saving operation is turned off, the method, implemented by the at least one processor, comprising:
acquiring a current air-conditioning state of the room during the energy-saving operation of the air conditioner;
estimating the value of the discomfort of the occupant in the room, by applying the discomfort probability model to the time elapsed after the energy-saving operation is turned on and before the present time and the acquired air-conditioning state; and turning off the energy-saving operation when the estimated value of the discomfort is larger than or equal to a predetermined value.

\* \* \* \* \*